United States Patent
Eck et al.

(10) Patent No.: US 11,906,030 B2
(45) Date of Patent: Feb. 20, 2024

(54) CONTINUOUSLY VARIABLE TRANSMISSION ENGINE BRAKING SYSTEM

(71) Applicant: TEAM Industries, Inc., Bagley, MN (US)

(72) Inventors: Brian George Eck, Bemidji, MN (US); Allen Lloyd Olson, Hines, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/067,188

(22) Filed: Dec. 16, 2022

(65) Prior Publication Data

US 2023/0193990 A1    Jun. 22, 2023

Related U.S. Application Data

(60) Provisional application No. 63/375,480, filed on Sep. 13, 2022, provisional application No. 63/290,782, filed on Dec. 17, 2021.

(51) Int. Cl.
*F16H 55/56* (2006.01)
*F16H 9/12* (2006.01)

(52) U.S. Cl.
CPC ............... *F16H 55/56* (2013.01); *F16H 9/12* (2013.01)

(58) Field of Classification Search
CPC .......... F16H 55/563; F16H 55/56; F16H 9/18; F16H 61/21; F16H 61/66245; F16H 61/66272; F16H 63/067; F16H 2061/6612

(Continued)

(56) References Cited

U.S. PATENT DOCUMENTS

| | | | |
|---|---|---|---|
| 3,939,720 A * | 2/1976 | Aaen | F16H 55/563 474/46 |
| 3,958,461 A * | 5/1976 | Aaen | F16H 55/563 474/14 |

(Continued)

FOREIGN PATENT DOCUMENTS

| | | |
|---|---|---|
| CN | 101526126 A | 9/2009 |
| CN | 201407322 | 2/2010 |

(Continued)

OTHER PUBLICATIONS

U.S. Patent and Trademark Office, "Office Action", U.S. Appl. No. 17/556,417, dated Jul. 5, 2023, pp. 1 through 14, Published: US.

*Primary Examiner* — Henry Y Liu
(74) *Attorney, Agent, or Firm* — Fogg & Powers LLC

(57) ABSTRACT

A drive sheave assembly of a continuously variable transmission is provided that includes a post, a fixed sheave, a movable sheave assembly, a sleeve and an engine braking assembly. The engine braking assembly includes an axial activation member, a one-way engagement member and a flange. The axial activation member is statically mounted within a central recess of the fixed sheave. The axial activation member is movably connected with the one-way engagement member. A central passage of the one-way engagement member is configured to engage a portion of the sleeve. The flange is coupled to the one-way engagement member to selectively engage a side of an endlessly looped member with axial movement of the one-way engagement member during an engine braking condition.

20 Claims, 27 Drawing Sheets

(58) Field of Classification Search
USPC .............................. 474/14, 19, 46, 70, 13, 38
See application file for complete search history.

(56) References Cited

U.S. PATENT DOCUMENTS

| | | | | |
|---|---|---|---|---|
| 6,149,540 | A * | 11/2000 | Johnson | F16H 61/66227 474/46 |
| 6,743,129 | B1 * | 6/2004 | Younggren | F16H 55/56 474/19 |
| 6,811,504 | B2 * | 11/2004 | Korenjak | F01M 11/02 474/42 |
| 7,072,754 | B1 * | 7/2006 | Sherrod | B60W 30/18136 477/44 |
| 7,674,197 | B2 * | 3/2010 | Aitcin | F16H 61/66272 474/10 |
| 8,272,981 | B2 * | 9/2012 | Galletti | F16H 9/12 474/23 |
| 8,534,413 | B2 * | 9/2013 | Nelson | B60W 30/1882 474/8 |
| 8,651,986 | B2 * | 2/2014 | Ochab | F16D 43/18 474/11 |
| 8,668,623 | B2 * | 3/2014 | Vuksa | F16H 63/067 477/80 |
| 9,057,432 | B1 * | 6/2015 | Bouffard | F16H 55/56 |
| 9,228,644 | B2 * | 1/2016 | Tsukamoto | F16H 9/18 |
| 9,353,835 | B2 * | 5/2016 | Sekiya | F16H 57/0434 |
| 9,797,485 | B2 * | 10/2017 | Ebihara | F16H 63/062 |
| RE47,790 | E * | 12/2019 | Bult | F15D 1/08 |
| RE47,798 | E | 1/2020 | Tsukamoto et al. | |
| 10,641,366 | B2 * | 5/2020 | Kuhl | F16H 9/18 |
| 11,339,866 | B2 * | 5/2022 | Eck | F16H 29/12 |
| 2002/0032088 | A1 * | 3/2002 | Korenjak | F02B 61/045 474/14 |
| 2002/0155909 | A1 * | 10/2002 | Roby | F16H 55/56 474/46 |
| 2003/0221890 | A1 * | 12/2003 | Fecteau | F16H 55/56 180/210 |
| 2004/0214668 | A1 * | 10/2004 | Takano | F16H 63/067 474/14 |
| 2011/0092325 | A1 * | 4/2011 | Vuksa | F16H 9/18 192/45.02 |
| 2014/0235382 | A1 * | 8/2014 | Tsukamoto | F16H 63/067 474/14 |
| 2015/0011344 | A1 * | 1/2015 | Ebihara | F16H 63/062 474/8 |
| 2015/0024882 | A1 * | 1/2015 | Ochab | F16H 63/067 474/19 |
| 2015/0111674 | A1 * | 4/2015 | Yuan | F16H 55/563 474/14 |
| 2018/0180141 | A1 * | 6/2018 | Kuhl | F16H 61/66245 |
| 2019/0323593 | A1 * | 10/2019 | Eck | F16H 55/171 |
| 2020/0149615 | A1 | 5/2020 | Kuhl et al. | |
| 2022/0213958 | A1 * | 7/2022 | Eck | F16H 61/662 |

FOREIGN PATENT DOCUMENTS

| | | |
|---|---|---|
| CN | 101526126 B | 12/2010 |
| CN | 103343786 A | 10/2013 |
| CN | 2015001269 A | 1/2015 |
| CN | 204300258 U | 4/2015 |
| CN | 106812897 A | 6/2017 |
| JP | 2004257458 A | 9/2004 |
| JP | 3160653 U | 7/2010 |

* cited by examiner

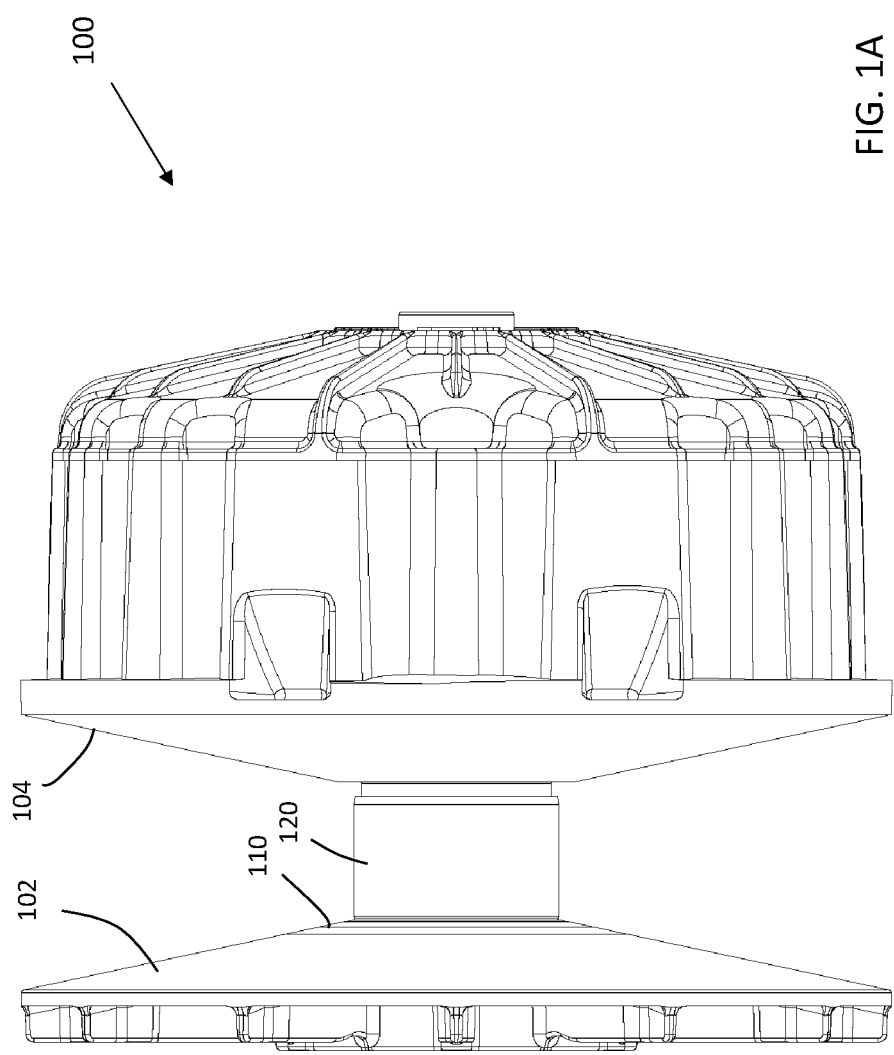

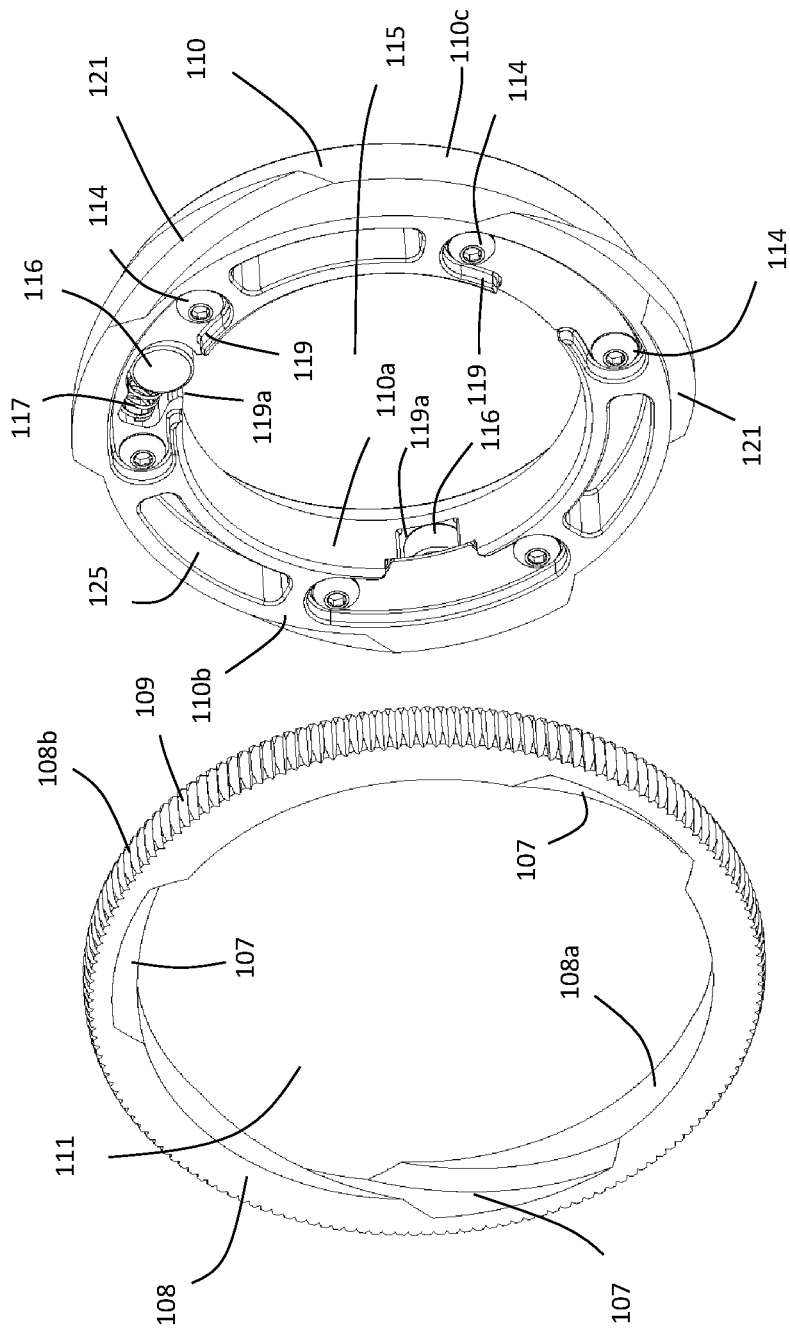

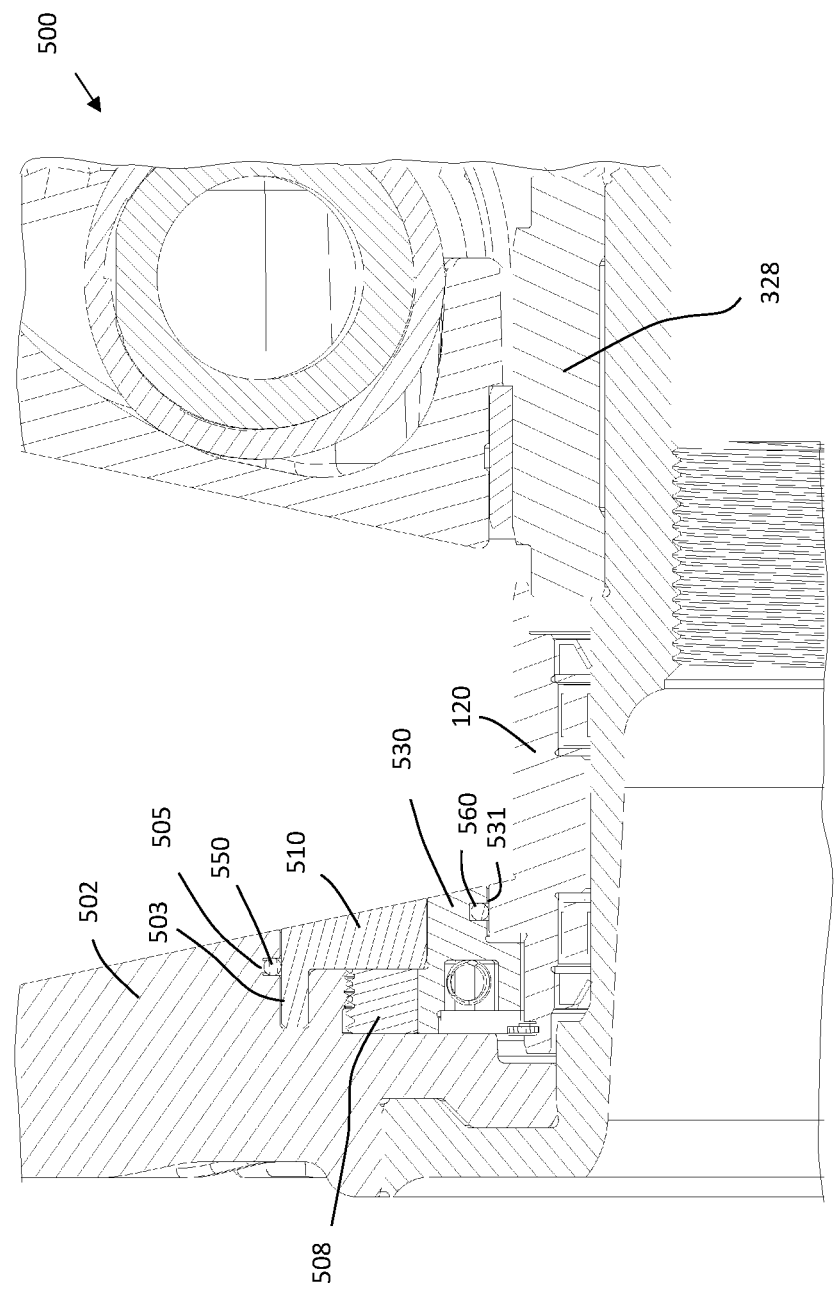

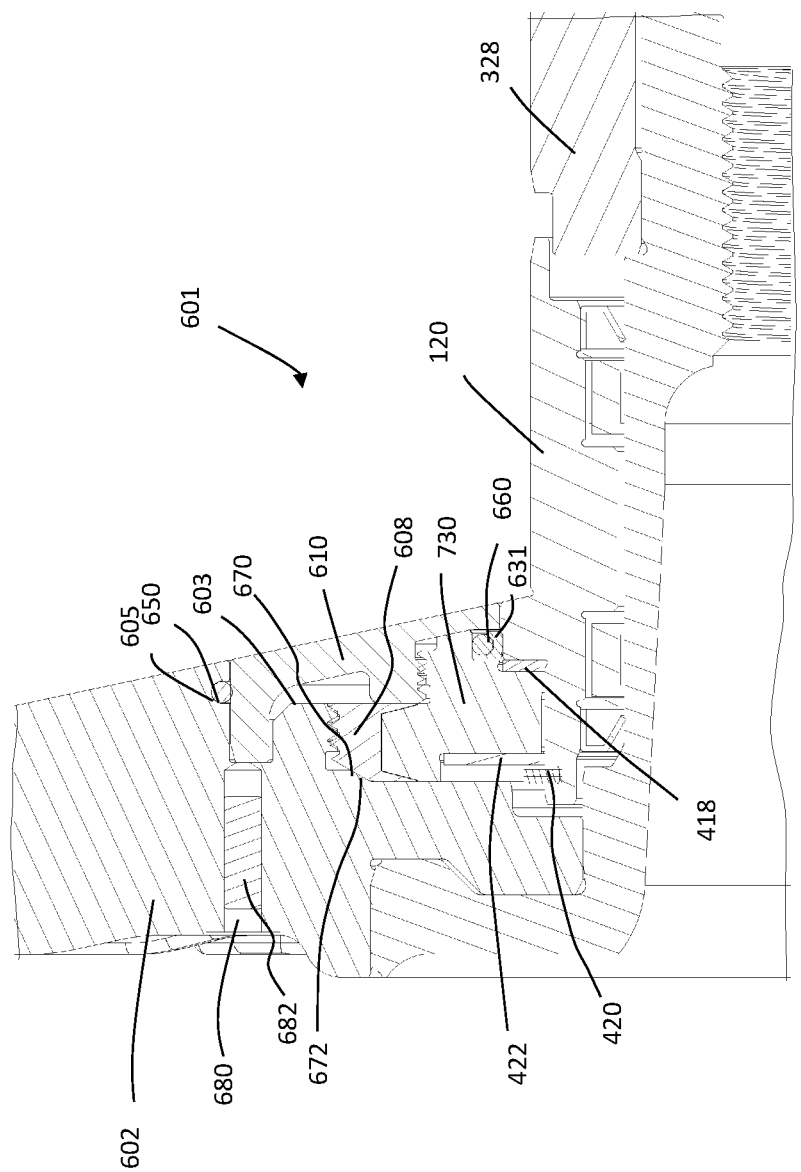

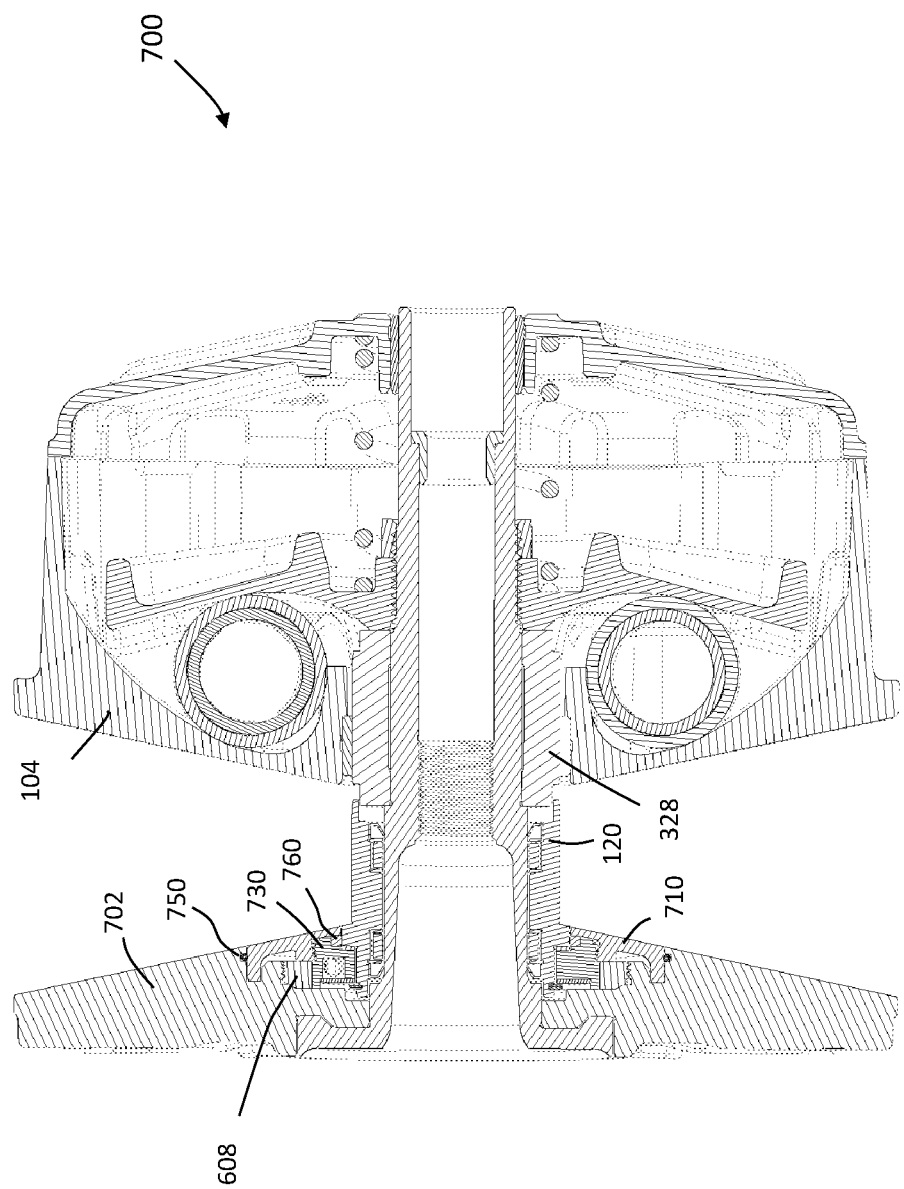

CONTINUOUSLY VARIABLE TRANSMISSION ENGINE BRAKING SYSTEM

CROSS-REFERENCE TO RELATED APPLICATIONS

This Application claims priority to Provisional Application Ser. No. 63/375,480, same title herewith, filed on Sep. 13, 2022, and U.S. Provisional Application Ser. No. 63/290,782, same title herewith, filed on Dec. 17, 2021, which are both incorporated in their entirety herein by reference.

BACKGROUND

Continuously variable transmissions (CVTs) provide a transmission system that automatically adjusts gearing. A typical CVT includes a drive sheave assembly and a driven sheave assembly. The drive sheave assembly is in operational communication with an engine and the driven sheave assembly is in operational communication with a drivetrain of a vehicle. A belt provides operational communication between the drive sheave assembly and the driven sheave assembly. Each sheave assembly typically includes a fixed sheave and a movable sheave that are mounted on a post. A movable sheave activation assembly moves the movable sheave in relation to the fixed sheave to adjust a location of the belt in relation to a central axis of the sheave assembly to change the gearing by selectively causing the belt to ride up and down on engagement surfaces of the fixed and moveable sheaves.

Engine braking is a desired feature to help slow down a vehicle in certain situations. For example, if a vehicle is traveling down a steep hill, traditional braking systems to slow the vehicle may not be adequate. Engine braking is expressly desired in vehicles that are subject to extreme terrain such as, but not limited to, all-terrain vehicles (ATVs) and utility terrain vehicles (UTVs). Providing an engine braking system that includes a CVT can be a challenge since, during a typical engine braking situation, the fixed sheave and the moveable sheave of the drive sheave assembly are spaced away from each other with only an inner surface of the belt engaging a sleeve that is free to rotate on the post (to achieve an idle condition). A reliable efficient engine braking system for a CVT is desired.

SUMMARY

The following summary is made by way of example and not by way of limitation. It is merely provided to aid the reader in understanding some of the aspects of the subject matter described. Embodiments provide a drive sheave assembly of a CVT with an engage braking assembly that includes a axial activation member that is received within a central recess of a fixed sheave and a one-way engagement member movably connected to the axial activation member within the central recess.

In one embodiment, a drive sheave assembly of a continuously variable transmission is provided. The drive sheave assembly includes a post, a fixed sheave, a movable sheave assembly, a sleeve and a movable sheave assembly. The fixed sheave is statically mounted on the fixed post. The fixed sheave includes a central recess. The movable sheave assembly is slidably mounted on the post. The movable sheave assembly includes a movable sheave activation assembly used to axially move the movable sheave assembly on the post. The sleeve is rotatably mounted on the post. At least a portion of the sleeve is positioned between the fixed sheave and the movable sheave assembly. The engine braking assembly includes an axial activation member, a one-way engagement member and a flange. The axial activation member is statically mounted within the central recess of the fixed sheave. The axial activation member has an inner surface that defines a central passage of the axial activation member. The inner surface of the axial activation member includes one of a plurality of engaging grooves and a plurality of extending guides. The one-way engagement member includes an inner surface that defines a central passage of the one-way engagement member. The central passage of the one-way engagement member is configured to engage a portion of the sleeve. The one-way engagement member includes an outer surface. A first portion of the outer surface of the one-way engagement member includes one of a plurality of engaging grooves and a plurality of extending guides configured to engage the one of the plurality of engaging grooves and the plurality of extending guides of axial activation member to create a moveable connection. The one-way engagement member is configured to rotate freely on the sleeve when the sleeve rotates in a first direction and lock onto the rotation of the sleeve when the sleeve rotates in a second direction causing the moveable connection between the one-way engagement member and the axial member to move the one-way member axially. The flange is coupled to the one-way engagement member to selectively engage a side of a belt with axial movement of the one-way engagement member.

In another embodiment, another drive sheave assembly of a continuously variable transmission is provided. The drive sheave assembly includes a post, a fixed sheave, a moveable sheave assembly, a sleeve, and an engine braking assembly. The fixed sheave is statically mounted on the post. The fixed sheave includes a central recess. The movable sheave assembly is slidably mounted on the post. The movable sheave assembly includes a movable sheave activation assembly to axially move the movable sheave assembly on the post. The sleeve is rotatably mounted on the post. At least a portion of the sleeve is positioned between the fixed sheave and the movable sheave assembly. The engine braking assembly includes an axial activation member that is coupled within the central recess of the fixed post. The axial activation member includes an inner surface that has insides grooves. The one-way engagement member includes an inner surface that defines a central passage of the one-way engagement member. The central passage of the one-way engagement member is configured to engage a portion of the sleeve. The one-way engagement member is configured to lock onto the sleeve during an engine braking condition. The one-way engagement member further includes outside extending guides that are received within the inside grooves of the axial activation member. The engine braking assembly further includes a flange mounted on the one-way collar to selectively engage a side edge of belt during the engine braking condition due to an axial movement of the one-way engagement member.

In yet another embodiment, a vehicle is provided. The vehicle includes an engine to generate engine torque, a drivetrain that is configured to deliver the engine torque to wheels of the vehicle, and a CVT coupling the engine torque between the engine and the drive train. The CVT includes a drive sheave in operational communication with the engine and driven sheave in operational communication with the drivetrain. The drive sheave is in operational communication with the drive sheave with an endless looped member. The drive sheave includes a post, a fixed sheave, a movable sheave assembly, a sleeve, and an engine braking assembly. The fixed sheave is statically mounted on the fixed post. The fixed sheave includes a central recess. The movable sheave assembly is slidably mounted on the post. The movable sheave assembly includes a movable sheave activation assembly to axially move the movable sheave assembly on the post. The sleeve is rotatably mounted on the post. At least a portion of the sleeve is positioned between the fixed sheave and the movable sheave assembly. The engine braking assembly includes an axial activation member, a one-way engagement member, and a flange. The axial activation member is statically mounted within the central recess of the fixed sheave. The axial activation member has an inner surface that defines a central passage of the axial activation member. The inner surface of the axial activation member includes one of a plurality of engaging grooves and a plurality of extending guides. The one-way engagement member includes an inner surface that defines a central passage of the one-way engagement member. The central passage of the one-way engagement member is configured to engage a portion of the sleeve. The one-way engagement member includes an outer surface. A portion of the outer surface of the one-way engagement member includes one of a plurality of engaging grooves and a plurality of extending guides configured to engage the one of the plurality of engaging grooves and the plurality of extending guides of axial activation member to create a moveable connection. The one-way engagement member is configured to rotate freely on the sleeve when the sleeve rotates in a first direction and lock onto the rotation of the sleeve when the sleeve rotates in a second direction causing the moveable connection between the one-way engagement member and the axial member to move the one-way member axially. The flange is coupled to the one-way engagement member to selectively engage a side of the endless looped member with axial movement of the one-way engagement member.

BRIEF DESCRIPTION OF THE DRAWINGS

Embodiments can be more easily understood and further advantages and uses thereof will be more readily apparent, when considered in view of the detailed description and the following figures in which:

FIG. 1A is a side view of a drive sheave assembly of a CVT with an engine braking system in an inactivated configuration according to one exemplary embodiment;

FIG. 4A is a side perspective view of an axial activation member according to one exemplary embodiment;

FIG. 4B is a side perspective view of a one-way engagement member according to one exemplary embodiment;

FIG. 17 is a cross-sectional close-up view of another engine braking system accordingly to another exemplary embodiment;

FIG. 18 is a cross-sectional close-up view of still another engine braking system accordingly to another exemplary embodiment;

FIG. 22 illustrates an assembled cross-sectional side view of the drive sheave assembly of FIG. 21.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a CVT with an engine braking system (EBS) (CVT EBS) that implements a one-way engagement member to selective engage a portion of a belt during an engine braking situation to clamp down on the belt with an associated sheave assembly.

Figure 1B:
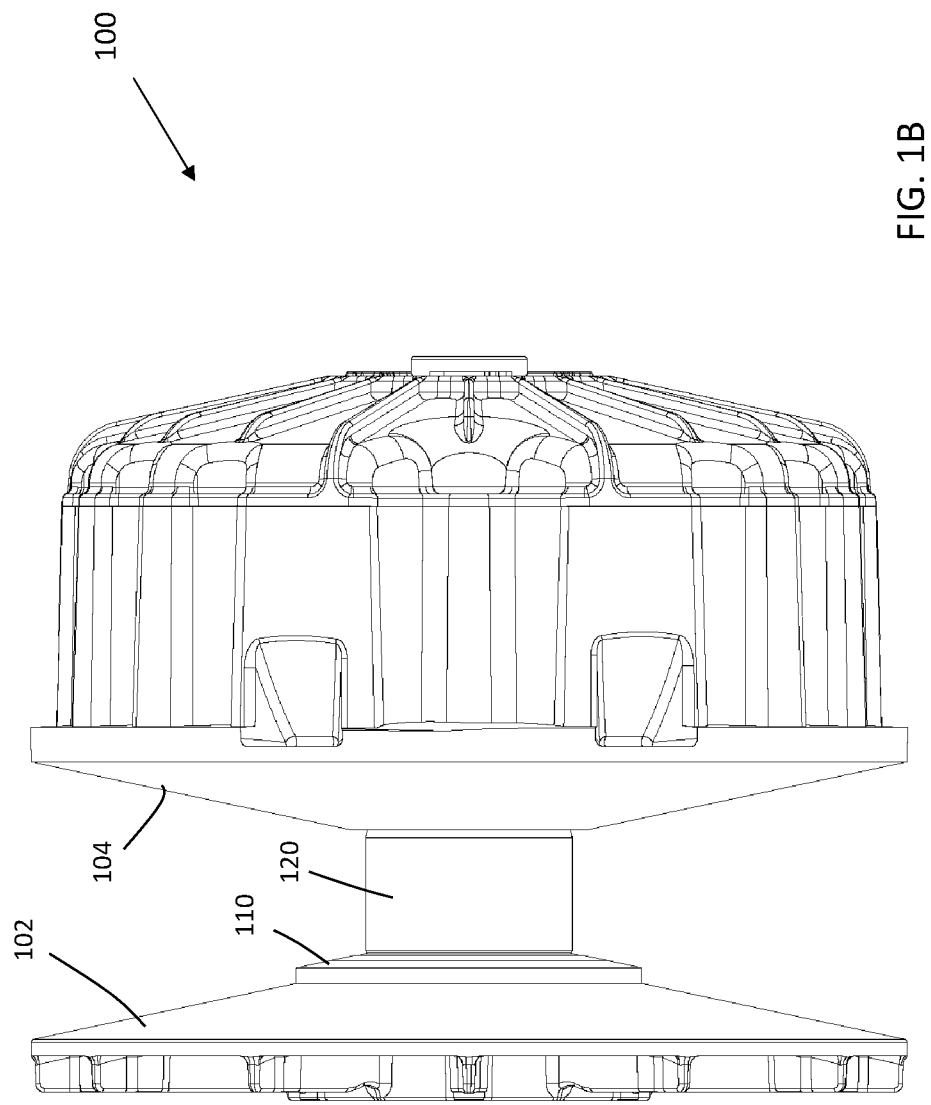
FIG. 1B is a side view of the drive sheave of a CVT of FIG. 1A with the engine braking system in an activated configuration according to one exemplary embodiment.

Referring to FIGS. 1A and 1B side views of an assembled drive sheave assembly 100 (drive clutch) of a CVT EBS of an example embodiment is illustrated. The drive sheave assembly 100 is part of a CVT such as CVT 304 discussed below in view of FIG. 7. The drive sheave assembly 100 (or drive clutch assembly) includes a fixed sheave 102 and a movable sheave assembly 104. The movable sheave assembly 104 is configured to move axially on a post 106 (illustrated in FIG. 2) in relation to the fixed sheave 102 under control of a movable sheave activation assembly 140 shown best in FIGS. 5A and 6A.

In one embodiment, the axial position of the movable sheave assembly 104 on a post 106 of the drive sheave assembly 100, is controlled by centrifugal forces the drive sheave assembly is experiencing due to rotation of the drive sheave assembly 100. Other types of systems to move the moveable sheave assembly 104 on the post 106 may be used. The drive sheave assembly 100 includes a one-way engagement member 110. The one-way engagement member 110 is in a retracted configuration in FIG. 1A. FIG. 1B illustrates the one-way engagement member 110 in a belt engaging configuration which would occur during an engine braking condition discussed below.

Figure 2:
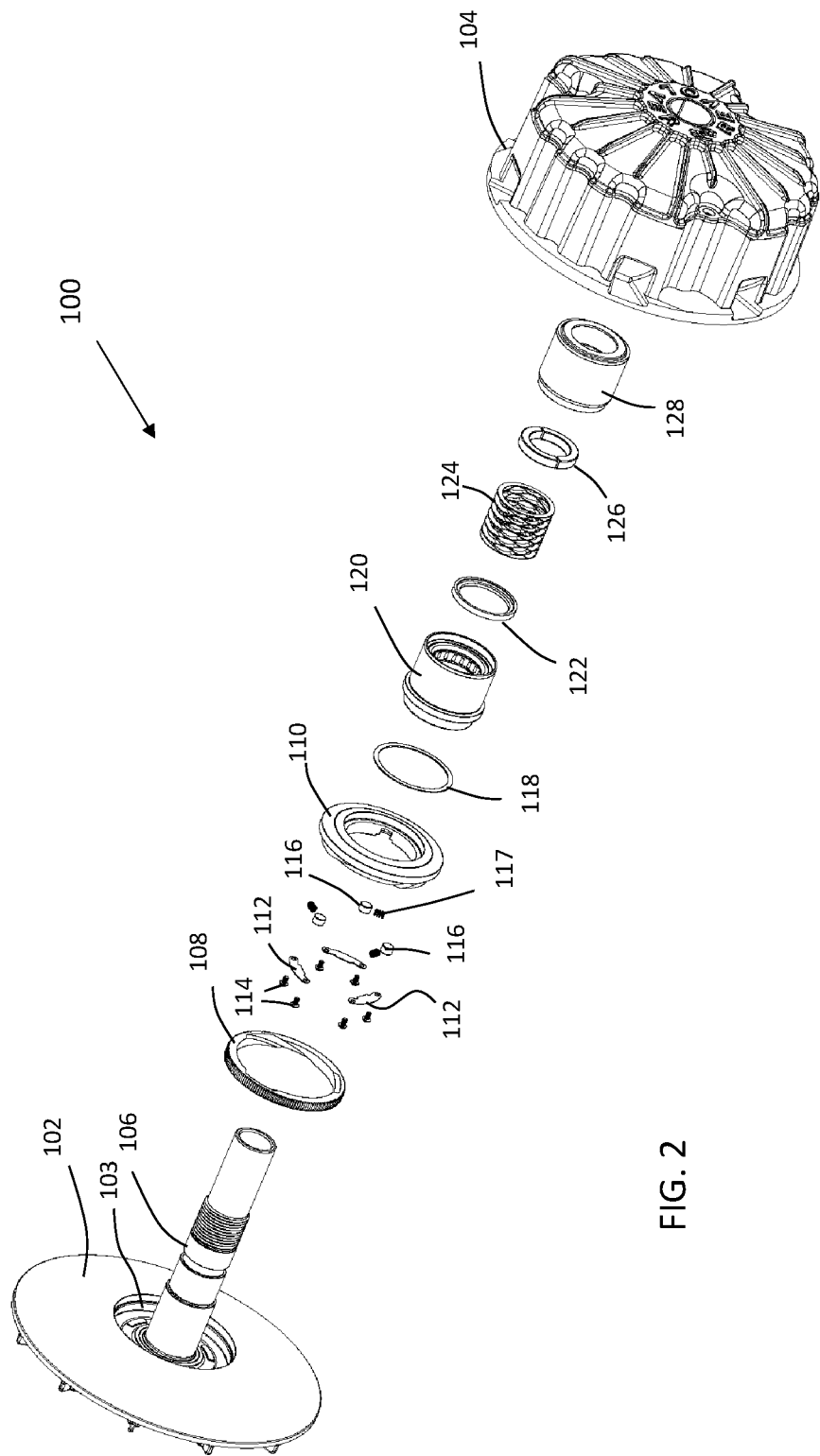
FIG. 2 is an unassembled view of the drive sheave assembly of FIG. 1A.

An unassembled view of the drive sheave assembly 100 is illustrated in FIG. 2. As illustrated, the drive sheave assembly 100 includes the fixed (or stationary) sheave 102 that is statically mounted on a post 106. The drive sheave assembly 100 further includes an axial activation member 108 that is received within a central recess 103 of the fixed sheave 102. Also included in the drive sheave assembly 100 is a one-way engagement member 110 which interacts with the axial activation member 108 to move axially on the post 106. The one-way engagement member 110 is positioned either entirely within the central recess 103 of the fixed sheave 102 during a non-engine braking condition or with a portion of the one-way engagement member 110 extending out of the central recess to engage a side of a belt during an engine braking condition. Further illustrated are a thrust washer 118, a sleeve 120, a thrust bias cap member 122, an engine braking disengagement bias member 124, a stop 126, and a shaft collar 128.

Figure 3:
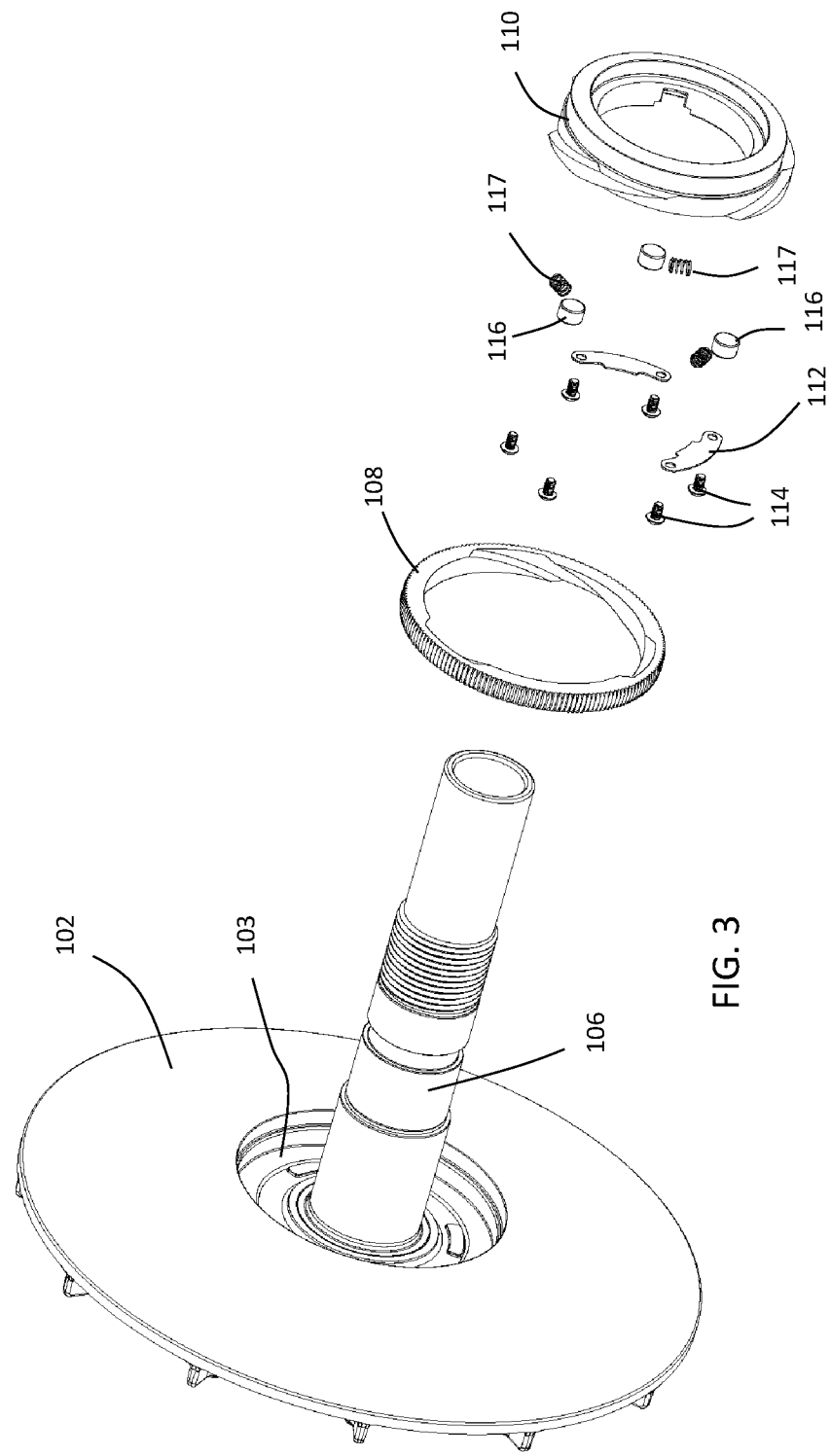
FIG. 3 is an unassembled side close-up perspective view of the fixed sheave, post, the axial activation member, and the one-way engagement member of the drive sheave assembly of FIG. 2.

A close-up view of the fixed sheave 102, post 106, the axial activation member 108 and the one-way engagement member 110 is illustrated in FIG. 3. Also illustrated in FIGS. 2 and 3 are locking rollers 116, roller biasing members 117, cover plates 112 and fasteners 114 that are associated with the one-way engagement member 110 as discussed below.

A close-up view of the axial activation member 108 is illustrated in FIG. 4A and the one-way engagement member 110 is illustrated in FIG. 4B. As illustrated In FIG. 4A, the axial activation member 108 in this example includes inner threads 107 in an inner surface 108a and a knurled feature 109 in an outer surface 108b. The inner surface 108a defines a central passage 111 of the axial activation member 108. The outer surface 108b extents around an outer parameter of the axial activation member 108. The knurled feature 109 is an interrupted surface designed to be press fitted with a smooth mating bore of a softer material, for example, aluminum within the recess of the fixed sheave 102, to create an interference fit that prevents undesired rotation and axial movement between the axial activation member 108 and the fixed sheave 102. Other types of connections may be used, including but not limited to, a spline connection, a traditional smooth bore interference fit, a threaded connection, a fastener connection, etc.

The one-way engagement member 110 of FIG. 4B in this example, includes an inner surface 110a that defines a central passage 115 of the one-way engagement member 110. The central passage 115 of the one-way engagement member 110 in this example is designed to receive a first portion of the sleeve 120. A side surface 110b of the one-way engagement member 110 includes pockets 119 in which associated locking rollers 116 and roller biasing members 117 are received. The roller covers 112 fastened to the one-way engagement member 110 with fasteners 114, retain the locking rollers 116 and roller biasing members 117 in their respective pockets 119 in the one-way engagement member 110. Each pocket 119 includes a window 119a though the inner surface 110a of the one-way engagement member 110 through which a portion of each locking roller 116 extends-through to engage a portion of the sleeve 120. A cam surface in each pocket 119 and the roller biasing members 117 work to allow the one-way engagement member 110 to rotate freely in a first direction in relation to the sleeve 120 and lock onto the sleeve 120 when trying to rotate in a second direction. The second direction occurs during an engine braking condition. Also illustrated in FIG. 4B are weight reducing pockets 125 within the side surface 110b of the one-way engagement member 110 designed to reduce the weight of the one-way engagement member 110 in this example.

Figure 4D:
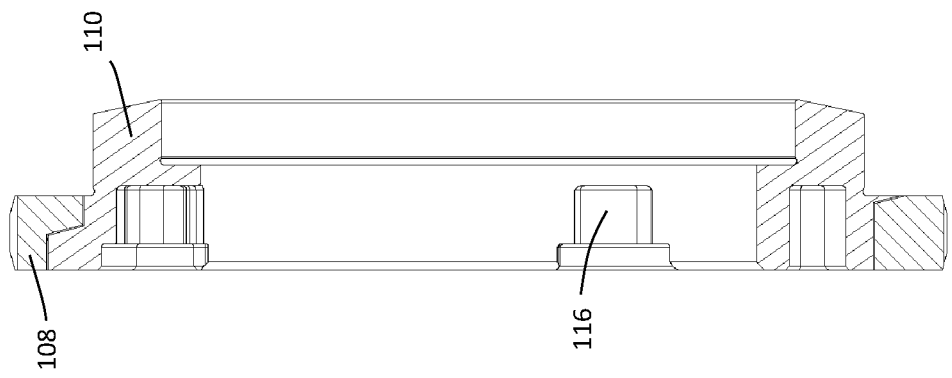
FIG. 4D is a cross-sectional side view of the assembled one-way engagement member and axial activation member of FIG. 4C.
Figure 4C:
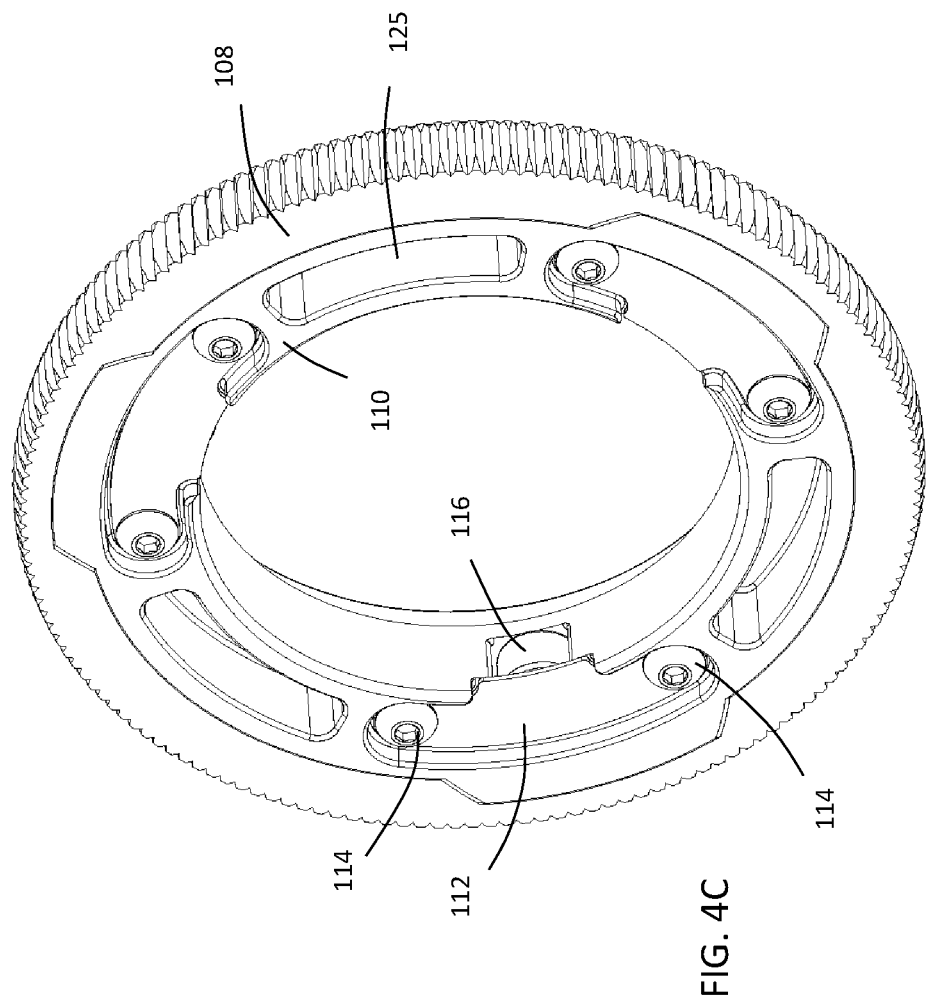
FIG. 4C is a side perspective view of an assembled one-way engagement member and axial activation member.

The one-way engagement member 110 further includes an outer surface 110c. The outer surface 110c of the one-way engagement member 110 includes outer threads 121 that are designed to engage the inner threads 107 of the axial activation member 108. This threaded connection provides the axial movement of the one-way engagement member 110 during an engine braking condition. An assembled view is provided in FIG. 4C. As illustrated, one-way engagement member 110 is received within the axial activation member 108. Further, FIG. 4D illustrates a cross-sectional side view of the assembled one-way engagement member 110 and axial activation member 108 in this example.

Figure 5A:
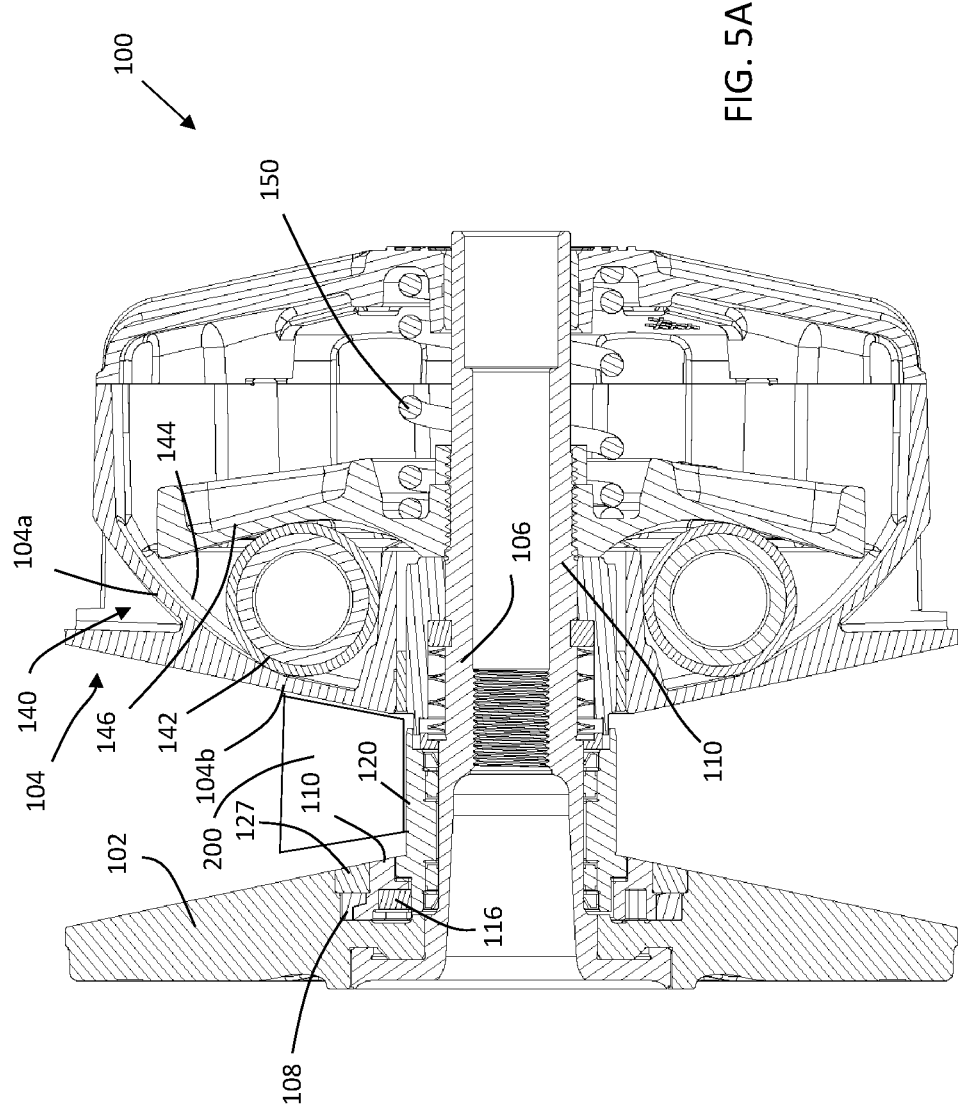
FIG. 5A is a cross-sectional side view of a drive sheave assembly in an idle configuration according to one exemplary embodiment.

Referring to FIG. 5A, a cross-sectional side view of the drive sheave assembly 100 is illustrated in an idle configuration. The movable sheave activation assembly 140 in this example includes ramps 144 positioned within a cavity of a housing 104a of the movable sheave assembly 104. A spider 146 is also position within the cavity of the housing 104a of the movable sheave assembly. The spider 146, in this example, is statically mounted on the post 106 so the spider does not move axially in relation to the post 106. Rollers 142 engaging both the ramps 144 and the spider 146 move radially outward as the rotational speed of the drive sheave assembly 100 increases. Movement of the rollers 142 radially outward pushes the housing 104a of the drive sheave assembly 100 towards the fixed sheave 102 countering a bias force from a main bias member 150.

In FIG. 5A the drive sheave assembly 100 is shown in an idle configuration. In the idle configuration, a conical engagement face surface 104b of the movable sheave assembly 104 is positioned away from the fixed sheave 102 so an inner surface of an endless looped member which (may be a belt 200) rides on a surface of the sleeve 120. In this configuration, the bias force from the main bias member 150 biases the engagement face surface 104b of the movable sheave assembly 104 to be positioned away from the fixed sheave 102.

Figure 5B:
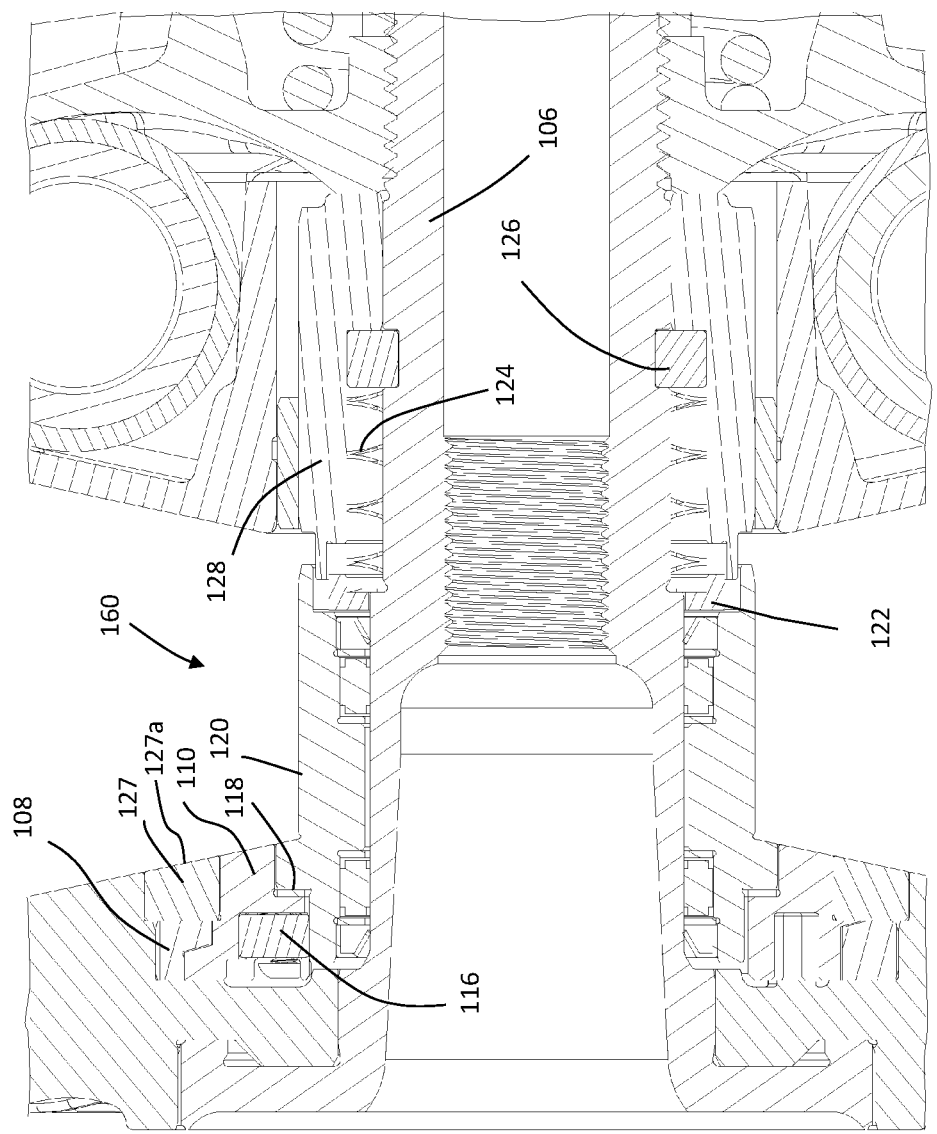
FIG. 5B is a partial close-up view of the drive sheave assembly of FIG. 5A illustrating an engine braking assembly according to one exemplary embodiment.

FIG. 5B illustrates a partial close-up view of the drive sheave assembly 100 in an idle configuration highlighting the engine braking assembly 160. The engine braking assembly 160 in this example includes the axial activation member 108, the one-way engagement member 110, the sleeve 120, the shaft collar 128 and the engine braking disengagement bias member 124. In this idle configuration without an engine braking condition, the engine braking disengagement bias member 124 exerts a force against a shoulder on post 106 which defines an axial clearance limit on the sleeve 120 via the thrust bias cap member 122 to keep the one-way engagement member 110 from moving axially on the post 106. As illustrated, the engine braking disengagement bias member 124 is positioned within the shaft collar 128 between the stop 126 and thrust bias cap member 122. Since the stop 126 is received within a holding groove of the post 106 the bias force from the engine braking disengagement bias member 124 is directed to the thrust bias cap member 122, sleeve 120 and the one-way engagement member 110.

In addition, in the example of FIGS. 5A and 5B, a flange 127 is press fitted on the one-way engagement member 110. Other ways of connecting the flange 127 to the one-way engagement member may be used including, but not limited to, a threaded connection, fasteners, etc. Use of the flange 127 allows for ease of manufacturing of the outside threads 121 of the one-way engagement member 110 (which are located to the left of the press fit flange 127). The external threads 121, with this configuration, fully meet up to a left side of the press fit flange 127 with no clearance relief required. The press fit flange also provides part of a belt engagement face 127a (illustrated in FIG. 5B) that interacts with a side of the belt 200 (illustrated in FIG. 5A) during gear shifting of the drive sheave assembly 100 and during an engine braking condition.

Figure 6A:
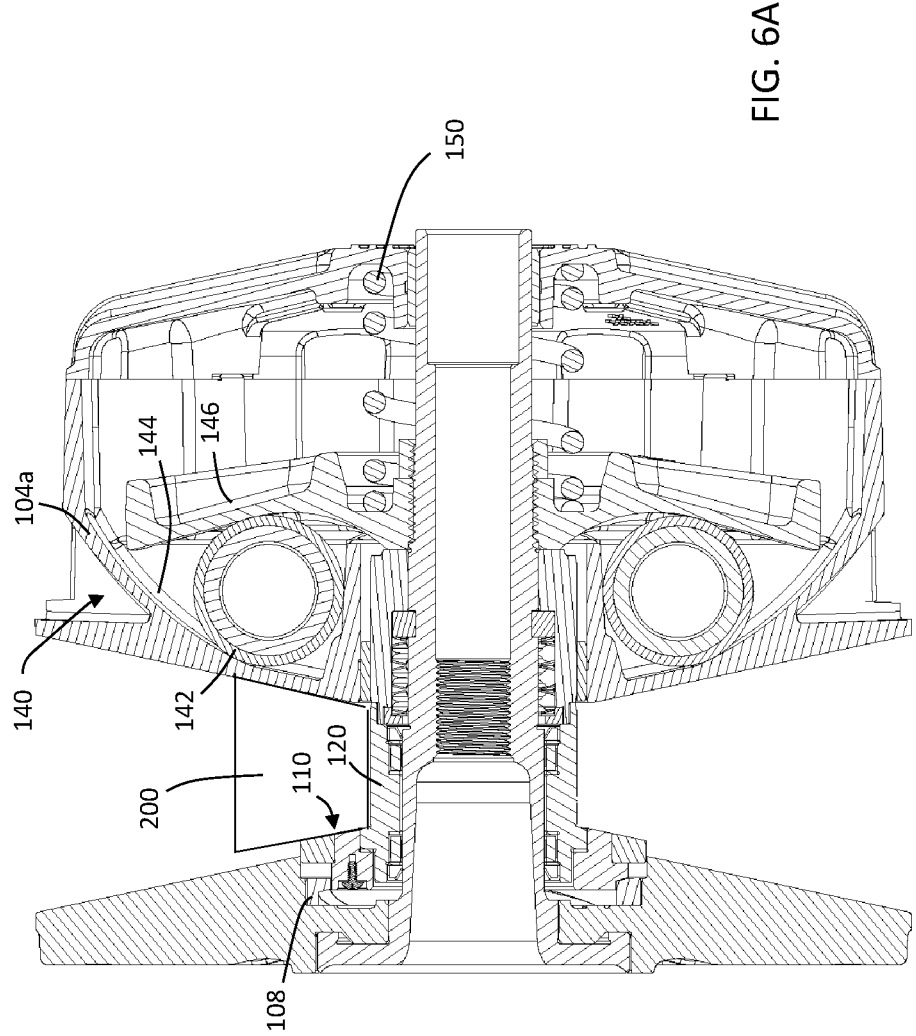
FIG. 6A is a cross-sectional side view of a drive sheave assembly in an idle configuration during a braking condition according to one exemplary embodiment.
Figure 6B:
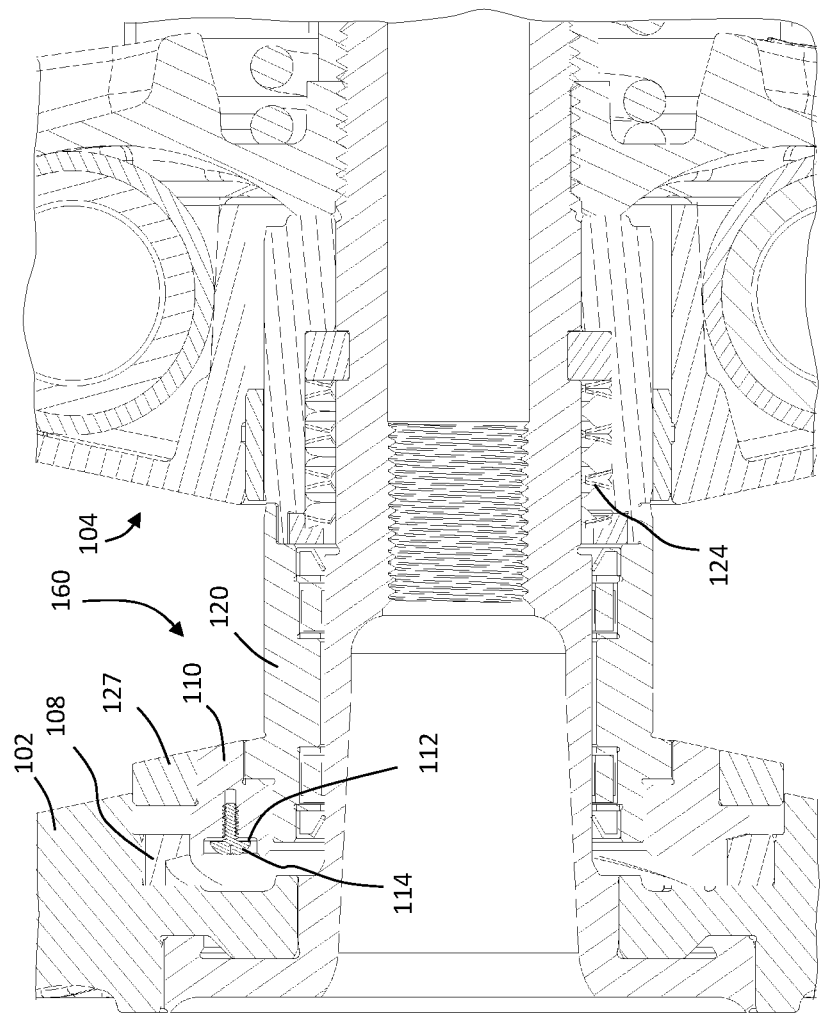
FIG. 6B is a partial close-up view of the drive sheave assembly of FIG. 6A illustrating an engine braking assembly according to one exemplary embodiment.

FIG. 6A is a cross-sectional view of the drive sheave assembly 100 in an idle configuration during an engine braking condition. FIG. 6B illustrates a partial close-up view of the drive sheave assembly 100 in an idle configuration illustrating the engine braking assembly 160 during the braking condition.

When a braking condition is encountered, the belt 200 engaging the sleeve 120 tries to overrun the sleeve 120 (rotating the sleeve in the second direction). When this happens, the one-way engagement member 110 locks onto the sleeve 120 causing the one-way engagement member 110 to rotate in the second direction with the sleeve 120. Since the axial activation member 108 is statically connected to the fixed sheave 102, the one-way engagement member 110 threadably rotates in relation to the axial activation member 108. In particular, as the one-way engagement member 110 rotates in relation to the axial activation member 108, the threaded connection between the inner threads 107 of the axial activation member 108 and the outside threads 121 of the one-way engagement member 110 axially moves the one-way engagement member 110, flange 127, and a portion of the sleeve 120 out of the central recess 103 of the fixed sheave 102 towards the movable sheave assembly 104. The threaded connection provides a force that counters the engine braking disengagement bias member 124 when the belt tries to overrun the sleeve 120 during an engine braking condition. As illustrated in FIGS. 6A and 6B the one-way engagement member 110 with press fit flange 127 have moved out of the central recess 103 to engage a side of belt 200 (illustrated in FIG. 6A) during an engine braking condition.

Once the belt 200 ceases trying to overrun the sleeve 120, the force provided by the engine braking disengagement bias member 124 assists the one-way engagement member 110 with press fit flange 127 to move back into the central recess 103 of the fixed sheave 102. Although the engine braking disengagement bias member 124 assists in returning the one-way engagement member 110 back into the central recess 103, the main force is provided by the reversal of torque when the engine RPM increases in the drive sheave assembly 100 so that the drive sheave assembly 100 is pulling the belt 200 instead of being pushed by the belt 200 (when no longer engine braking). This causes the contact of the belt 200 against the one-way engagement member 110 to thread itself backwards into the central recess 103 of the fixed sheave 102. Hence, this design pulls the one-way engagement member 110 back into the central recess 103 once the engine braking condition has passed.

Further, once the belt 200 becomes disengaged from the one-way engagement member 110, the engine braking disengagement bias member 124, along with residual drag at idle speed from rollers 116 against sleeve 120, keeps the one-way engagement member 110 seated fully in central recess 103. Additionally, rotational inertia working in the direction of threads 107 and 121 also help keep the one-way engagement member 110 seated fully in the central recess 103 during idle speeds.

Figure 7:
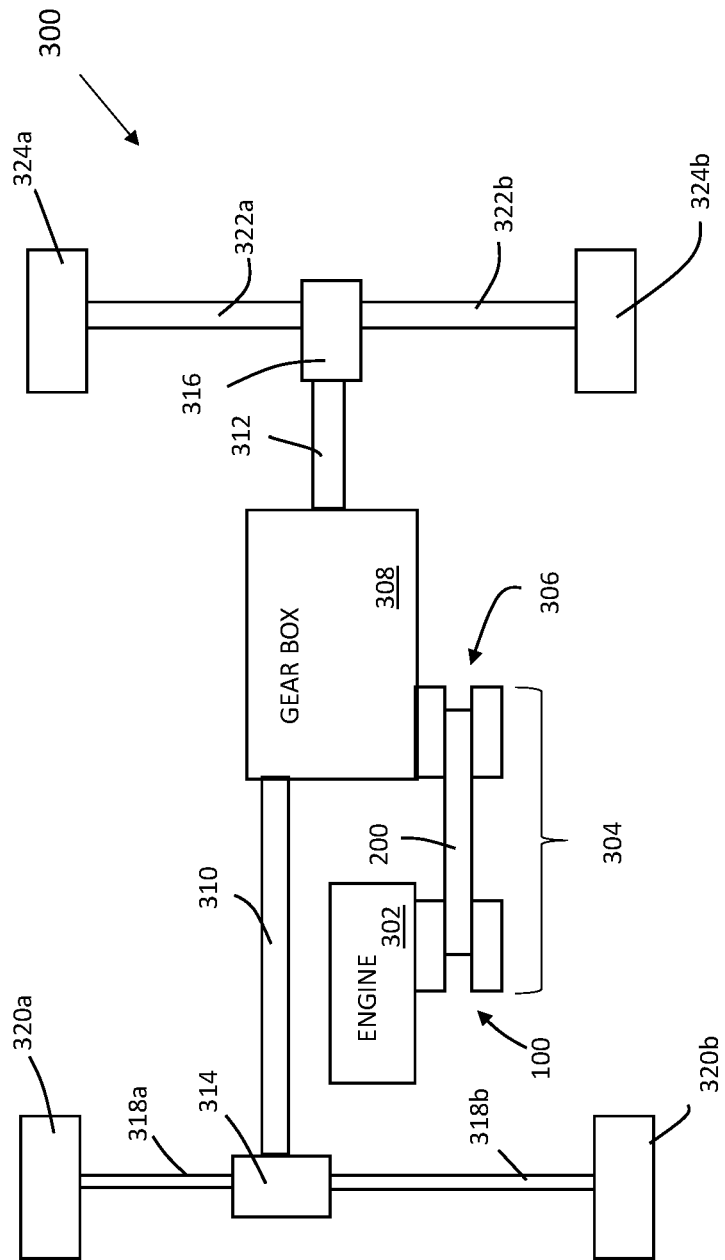
FIG. 7 is a block diagram of vehicle that includes a drive sheave assembly according to one exemplary embodiment.

Referring to block diagram of FIG. 7, an example vehicle 300 implementing a drive sheave assembly 100 is illustrated. The drive sheave assembly 100 is part of a CVT 304 that further includes the belt 200 (or endless looped member) and a driven sheave assembly 306. The drive sheave assembly 100 is in operational communication with an engine 302. The driven sheave assembly 306 is in operational communication with the drive sheave assembly 100 via the belt 200 to selectively communicate torque between the drive sheave assembly 100 and the driven sheave assembly 306.

The driven sheave assembly 306 is in communication with the drivetrain that, in this example, includes a gear box 308, a front and rear drive shaft 310 and 312 (or prop shafts), front and rear differentials 314 and 316, front half shafts 318a and 318b, rear half shafts 322a and 322b, front wheels 320a and 320b and rear wheels 324a and 324b.

As discussed above, an engine braking system that includes the one-way engagement member 110 is activated when torque from the drivetrain communicated through the driven sheave assembly 306 and belt 200 to the drive sheave assembly 100 tries to overrun the sleeve 120 (move the sleeve in the second direction). This may occur when the engine 302 is at idle while the vehicle 300 is traveling down a hill. This overrunning of the sleeve 120 causes the one-way engagement member 110 to lock onto the sleeve 120. Rotation of the one-way engagement member 110 in relation to the axial activation member 108 via the threads 107 and 121 moves the one-way engagement member 110 out of the recess 103 of the fixed sheave to engage a side of the belt 200. This pinches the belt between the fixed sheave 102 and the movable sheave assembly 104 to transfer engine braking through the belt 200 to the drivetrain of the vehicle 300.

When the belt 200 is no longer overrunning the sleeve 120 (rotating in the second direction), which will occur when the engine revolutions increase or when the terrain pitch the vehicle is encountering has been reduced, the engine braking system is disengaged. Although, the continuously variable transmission engine braking system is illustrated as being applied to a vehicle with wheels in FIG. 7, the system can be applied to other types of vehicles including, but not limited to, vehicles with one or more tracks.

Figure 8:
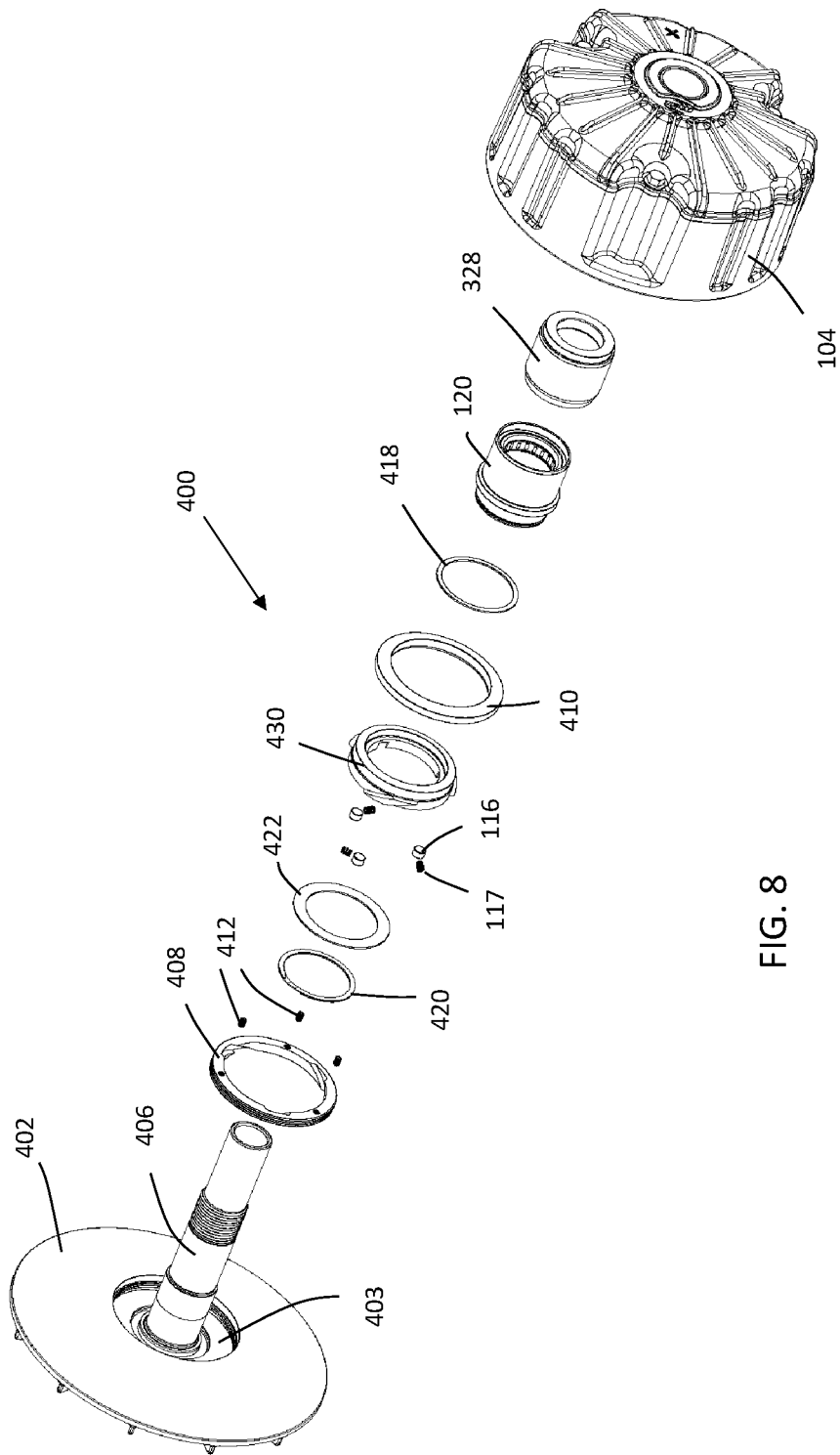
FIG. 8 is a side perspective view of an unassembled drive sheave assembly according to another exemplary embodiment.

Another example of a drive sheave assembly 400 is illustrated in the unassembled view of drive sheave assembly 400 of FIG. 8. As illustrated, drive sheave assembly 400 includes the fixed (or stationary) sheave 402 that is statically mounted on a post 406. The drive sheave assembly 400 further includes an axial activation member 408 that is received within a central recess 403 of the fixed sheave 402. Also included in the drive sheave assembly 400 is a one-way engagement member 430 and flange 410 which interact with the axial activation member 408 to move axially on the post 406 as discussed below. The one-way engagement member 430 and flange 410 are positioned either entirely within the central recess 403 of the fixed sheave 402 during a non-engine braking condition or with a portion of the flange 410 extending out of the central recess 403 to engage a side of a belt during an engine braking condition. Further illustrated are a thrust washer 418, a sleeve 120, and a shaft collar 328.

Figure 9:
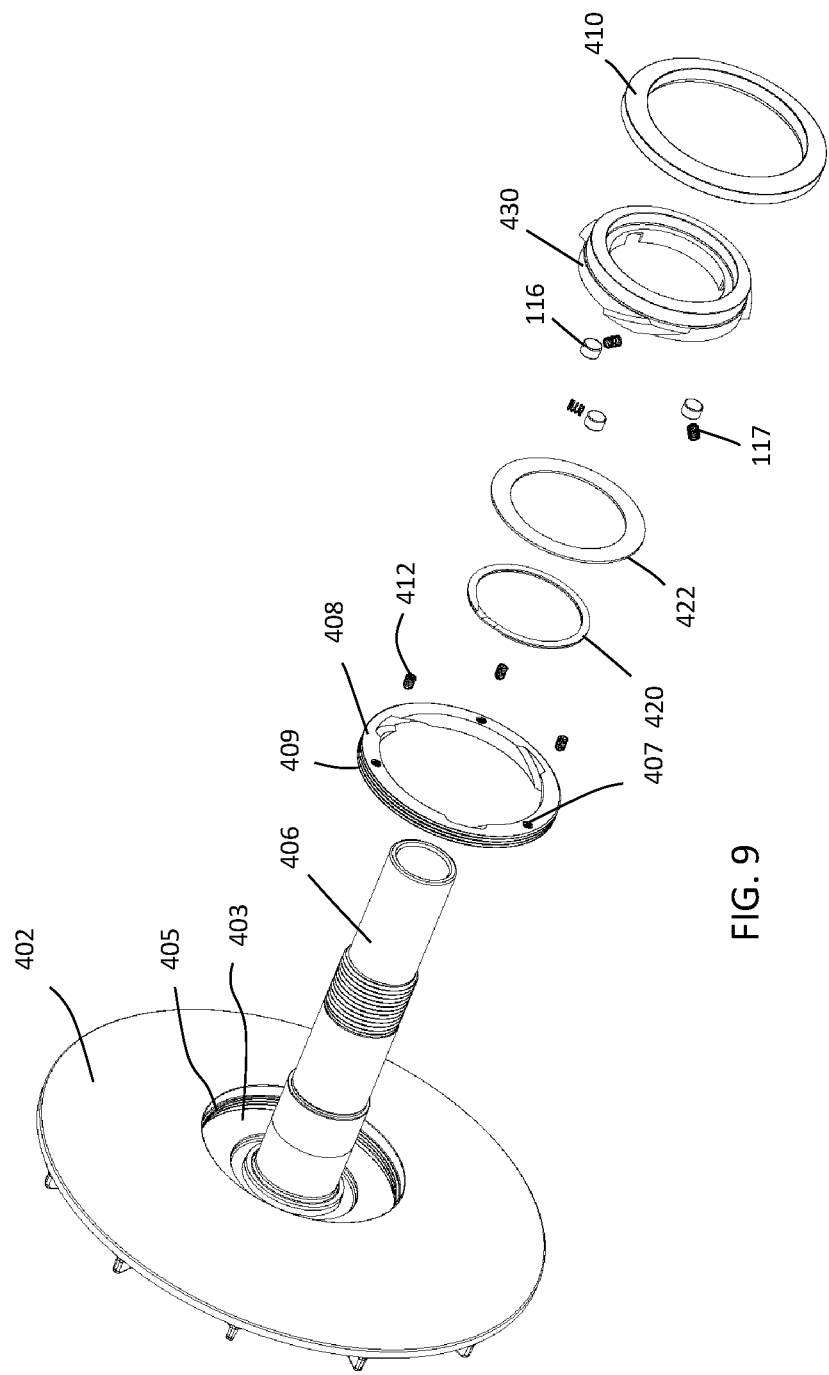
FIG. 9 is a side perspective view of a portion of the drive sheave assembly of FIG. 8.
Figure 10:
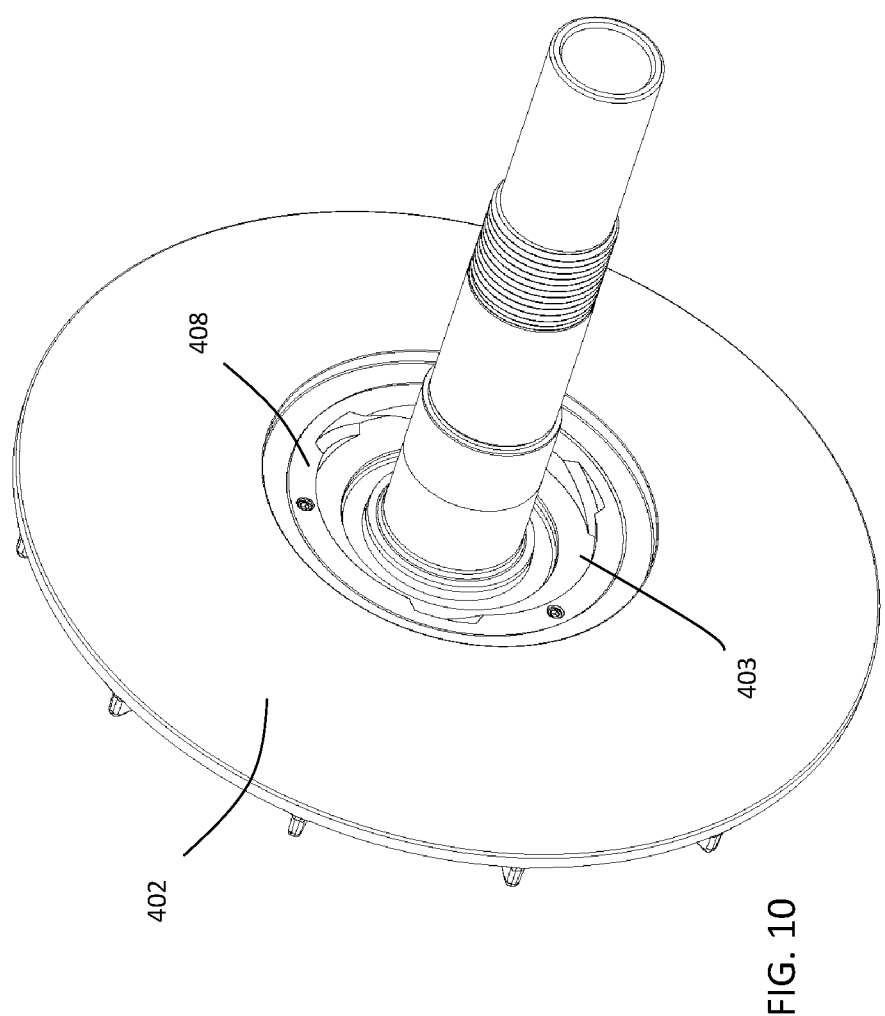
FIG. 10 is a side perspective view of the axial engagement member engaged with the fixed sheave of the drive sheave assembly of FIG. 8.

Referring to FIG. 9, a portion of the drive sheave assembly 400 is illustrated. The axial activation member 408 includes exterior threads 409 that are configured to threadably engage interior threads 405 in the central recess 403 of the fixed sheave 402. FIG. 10 illustrates the axial activation member 408 engaged with the fixed sheave 402 by the exterior threads 409 of the axial activation member 408 threadably engaging the interior threads 405 in the central recess 403 of the fixed sheave 402.

Figure 11:
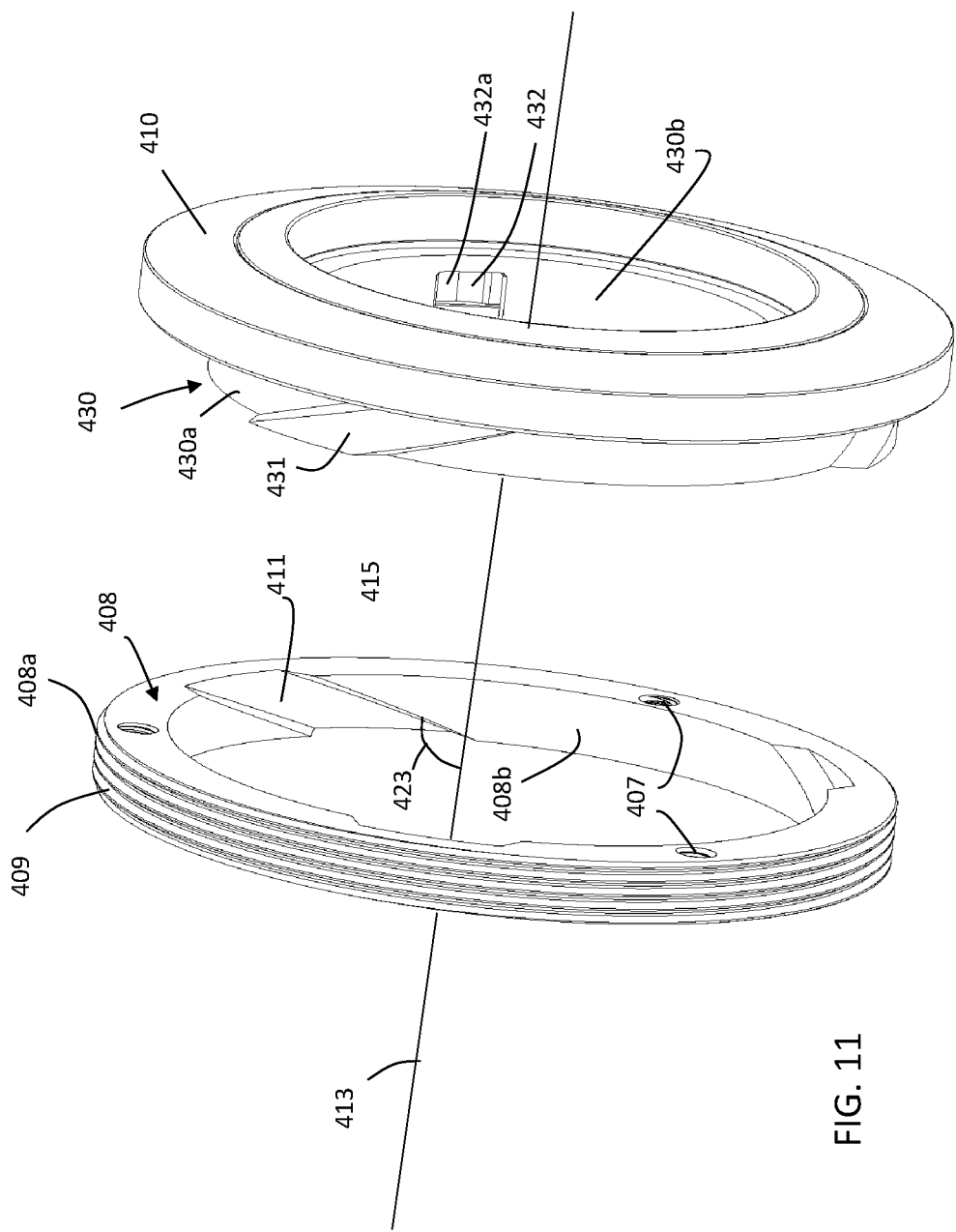
FIG. 11 is a side perspective view of the axial engagement member, an flange, and a one-way engagement member of the drive sheave assembly of FIG. 8.

FIG. 11 illustrates a close-up side perspective view of the axial activation member 408 and the one-way engagement member 430. FIG. 11 also illustrates a central axis 413. The axial activation member 408 is generally disked or ring shaped including a central opening 415. The axial activation member 408 includes an outer surface 408a that includes the exterior threads 409 and an inner surface 408b. The inner surface 408b in this example includes engaging grooves 411 that extend axially at a select angle 423. In another example the engaging grooves 411 are engaging threads. Also illustrated in FIG. 11 are spaced axial fastening bores 407 that receive fastening members 412. In one example, the axial fastening bores 407 are threaded and the fastening members 412 are set screws that threadably engage the threaded axial fastening bores 407. The set screws in an example pass through the respective axial fastening bores into the fixed sheave and are tightened to a specified torque. The use of axial fastening bores 407 and fastening members 412 retain the axial activation member 408 in place so the axial activation member 408 does not back out of the fixed sheave 402 during a reverse torque situation (engine braking situation).

The flange 410 of the one-way engagement member 430 is mounted on a first portion of an outer surface 430a of the one-way engagement member 430 and the axial activation member 408. The one-way engagement member 430 includes extending guides 431 that extend axially at a select angle on a second portion of the outer surface 430a of the one-way engagement member 430. The extending guides 431 are designed to be received within the engaging grooves 411 of the axial activation member 408 when the axially activation member 408 is mounted on the outer surface 430a of the one-way engagement member 430. During an engine braking situation, movement of the outside radially extending guides 431 on the one-way engagement member 430 within the inside grooves 411 of the axial activation member 408 cause the flange 410, one-way engagement member 430 and sleeve 120 to move axially towards the movable sheave assembly 104. In one example, the radial extending guides 431 are guide threads. Further in another example, the engaging grooves 411 are formed in the outer surface 430a on-way engagement member 430 and the extending guides are formed in the inner surface 408b of the axial activation member 408 to form the movable connection.

The one-way engagement member 430 further includes an inside surface 430b. Pockets 432 in the one-way engagement member 430 include windows 432a through the inside surface 430b of the one-way engagement member 430. Each pocket 432 houses an associated locking roller 116 and roller biasing members 117. The one-way engagement member 430 is mounted on the sleeve 120 in this example, where the locking roller 116, roller biasing members 117 and pocket configuration allows the one-way engagement member 430 to rotate freely in relation to the sleeve 120 in a first direction and lock rotation of the one-way engagement member 430 to the sleeve 120 in a second direction.

Figure 12:
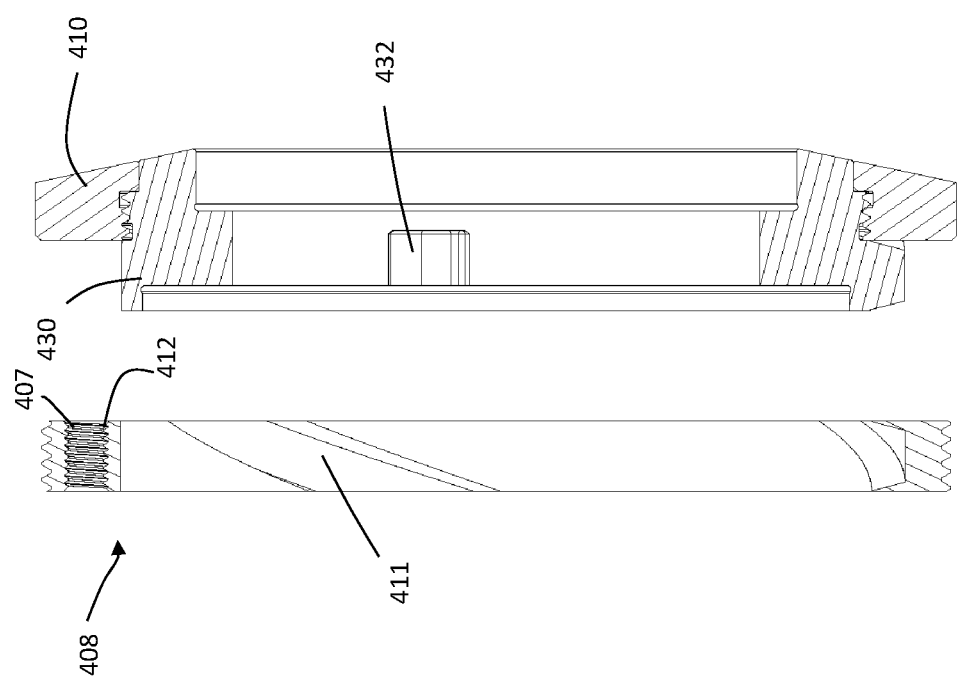
FIG. 12 is a cross-sectional side view of the axial engagement member, an flange, and a one-way engagement member of the drive sheave assembly of FIG. 8.

FIG. 12 illustrates a cross-sectional side view of the axial activation member 408, the one-way engagement member 430, and the flange 410. This example shows the flange 410 being mounted on the one-way engagement member 430 via threads. Other methods of mounting the flange 410 on the one-way engagement member 430 may be used including, but not limited to, press fitting, a fastener connection, welding, etc.

Figure 13:
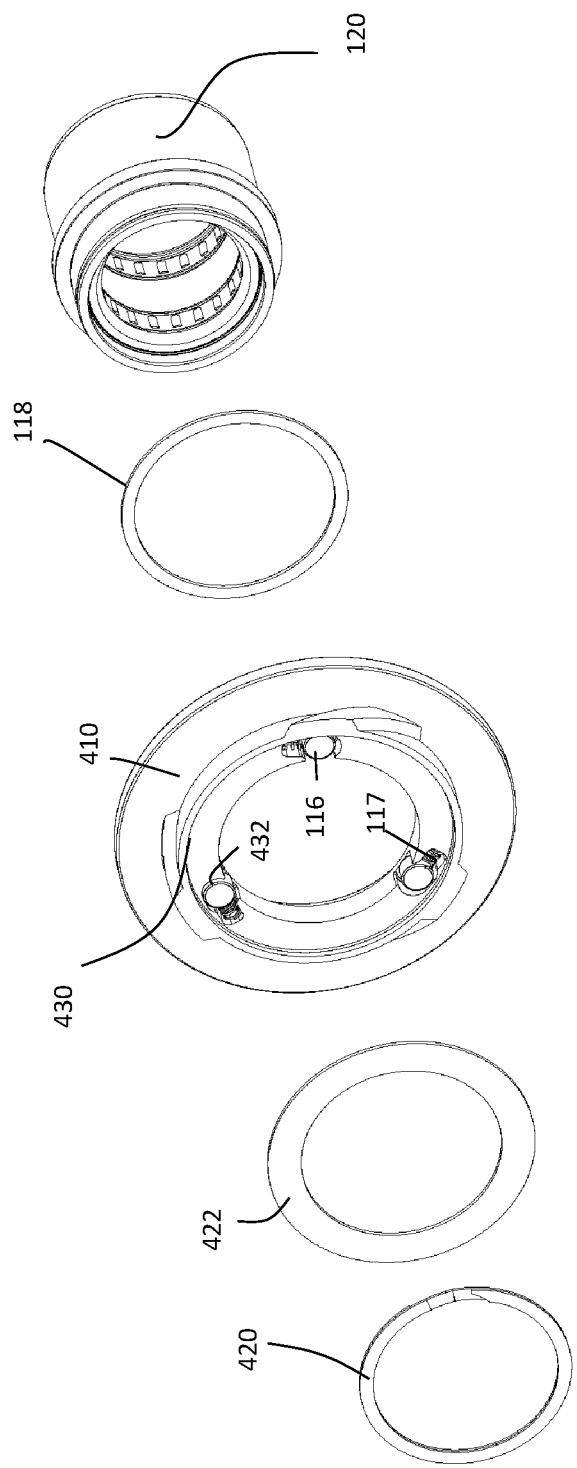
FIG. 13 is an unassembled side perspective view of a portion of the drive sheave assembly of FIG. 8.

FIG. 13 illustrates a side perspective view of a portion of the drive sheave assembly 400. Illustrated in FIG. 13 are the retaining ring 420, washer 422, the combined one-way engagement member 430 and flange 410, the thrust washer 118 and the sleeve 120. Further 13 illustrates the locking rollers 116 and roller biasing members 117 received within the pockets 432 of the one-way engagement member 430.

Figure 14:
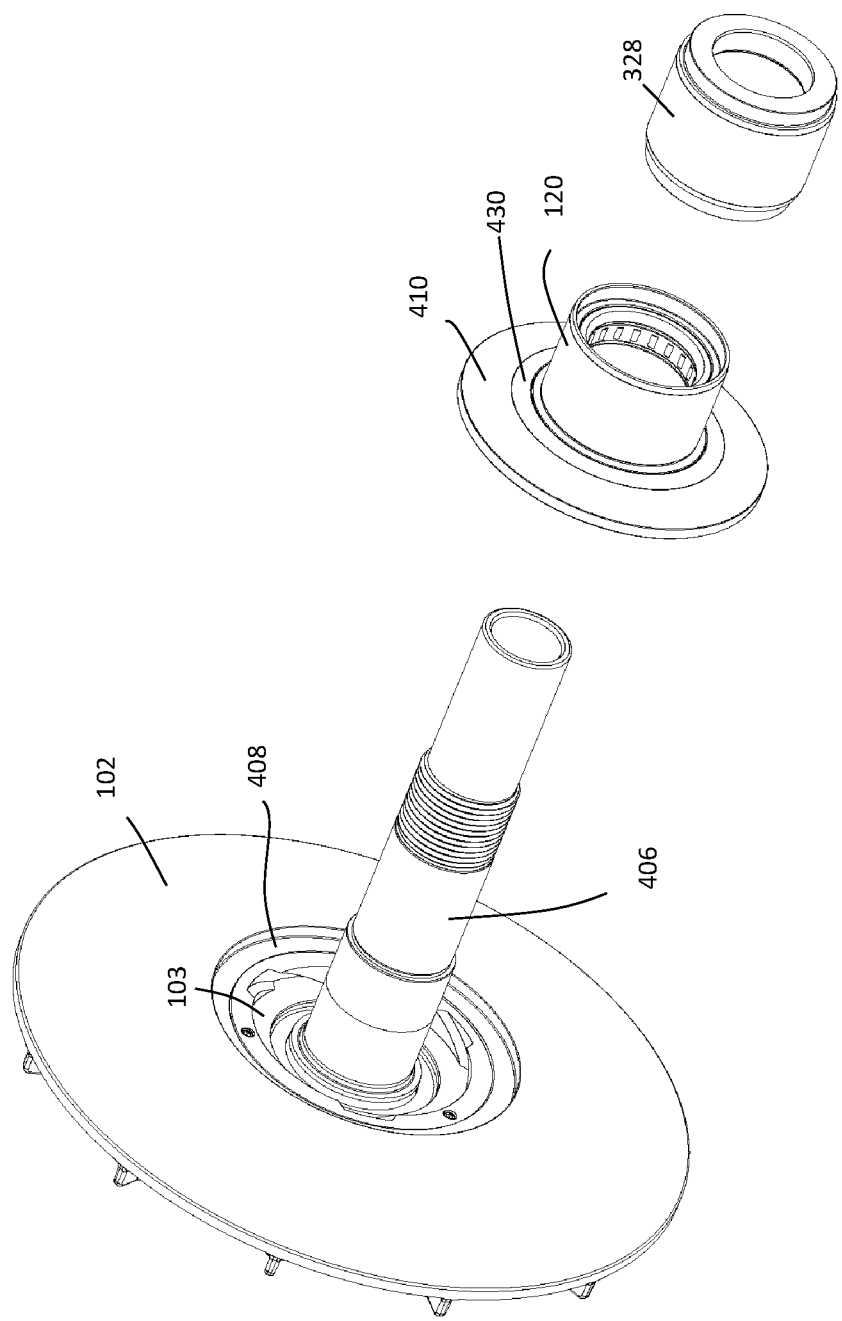
FIG. 14 is an unassembled side perspective view of a portion of the drive sheave assembly of FIG. 8.

FIG. 14 also illustrates a side view of a portion of the drive sheave assembly. FIG. 14 illustrates the axial activation member 408 threadably engaged within the central recess 103 of the fixed sheave 102. Also illustrated is the one-way engagement member 430 (that includes the flange 410 mounted on a portion of the sleeve 120 and the shaft collar 328.

Figure 15:
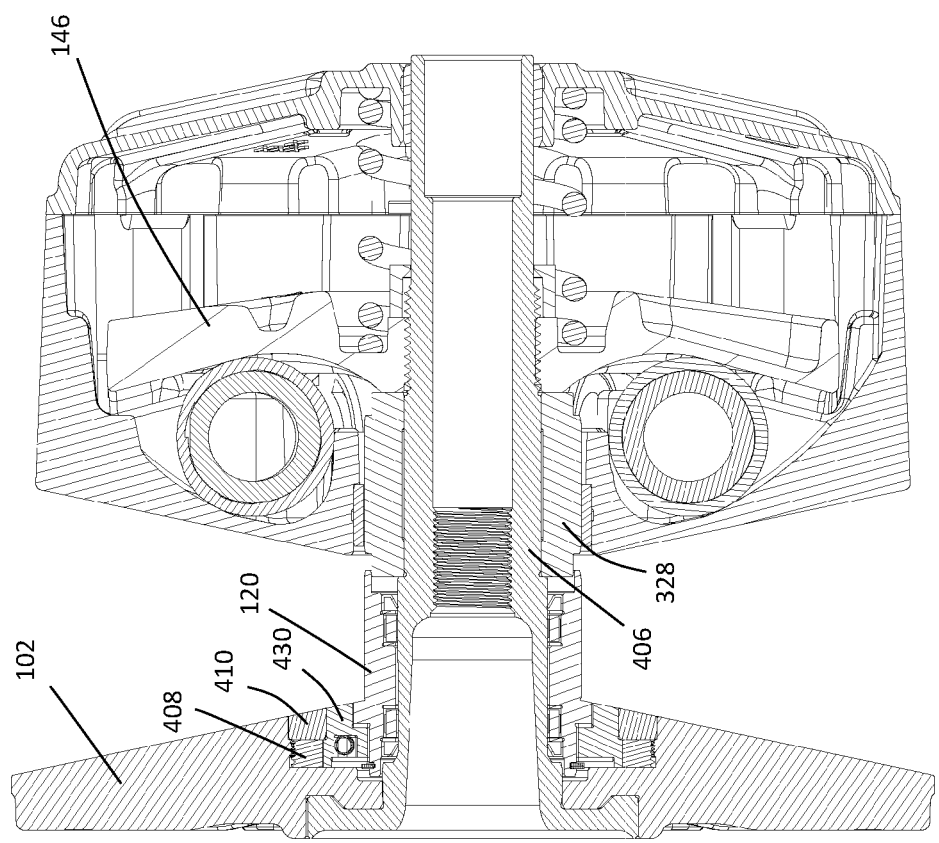
FIG. 15 is a cross-sectional side view of the drive sheave assembly of FIG. 8.

FIG. 15 illustrates a cross-sectional side view of the assembled drive sheave assembly 400. As illustrated, the shaft collar 328 is mounted on the post 406 in a manner that prevents axial movement of the shaft collar 328 in relation to the post 406. The shaft collar 328 is positioned between a spider 146 and the sleeve 120. The sleeve 120 moves axially on the post 406 along with the one-way engagement member 430, and flange 410. Axial movement of the sleeve 120, the one-way engagement member 430, the flange 410 is achieved by the engagement of the outside extending guides 431 on the one-way engagement member 430 within the inside grooves 411 of the axial activation member 408.

Figure 16A:
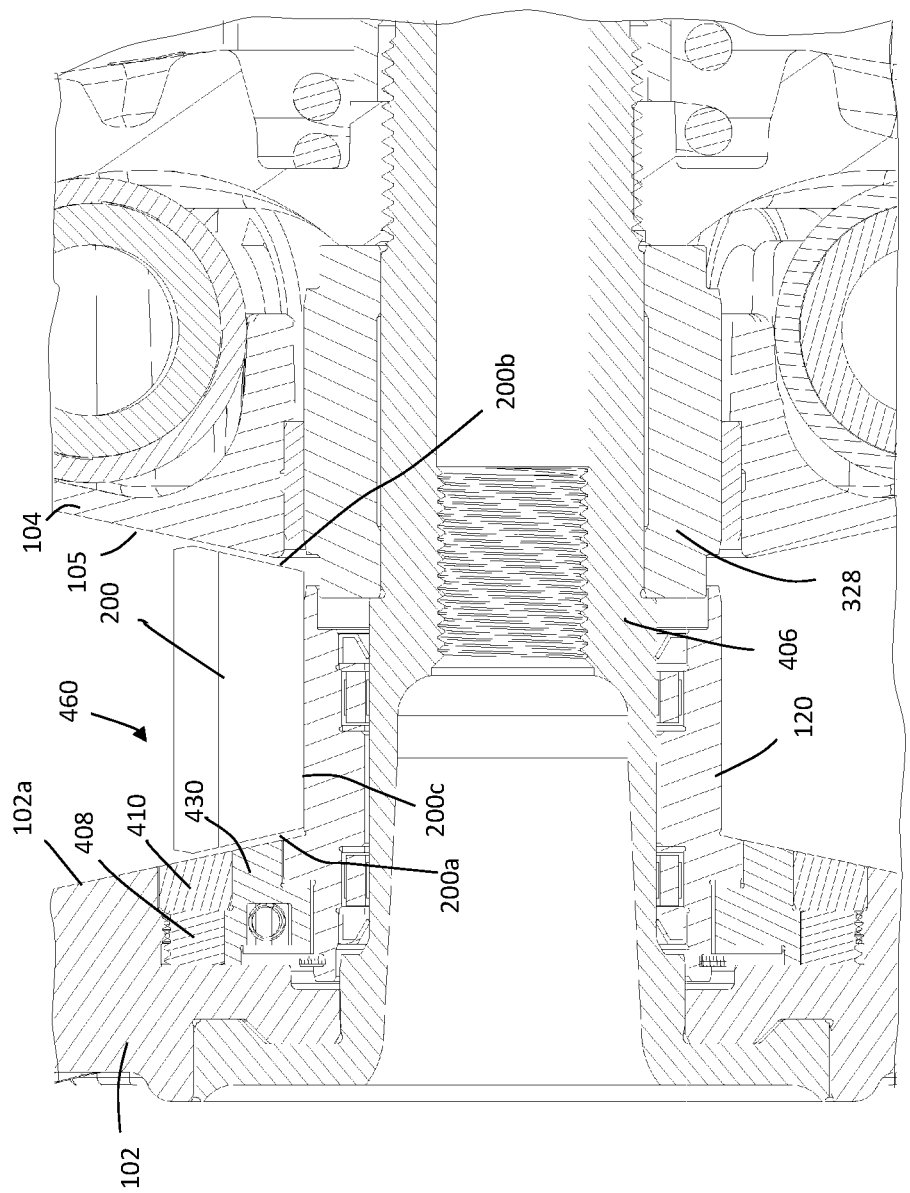
FIG. 16A is a cross-sectional close-up view of the engine braking system of the drive assembly of FIG. 8 in an inactive configuration.

FIG. 16A illustrates a close-up view of the engine braking system 460 of the drive sheave assembly 400 in an inactive configuration which may occur at vehicle idle. In this configuration, the one-way engagement member 430 and the flange 410 are received within the central recess 103 of the fixed sheave so that side edges 200a and 200b of the belt 200 are not engaged by engaging faces 102a and 105 of the respective fixed sheave 102 and movable sheave assembly 104 so torque is not coupled between the drive sheave assembly 400 and the belt 200. The inner face 200c of the belt 200 engages the sleeve 120 which is free to rotate on the post 406.

Figure 16B:
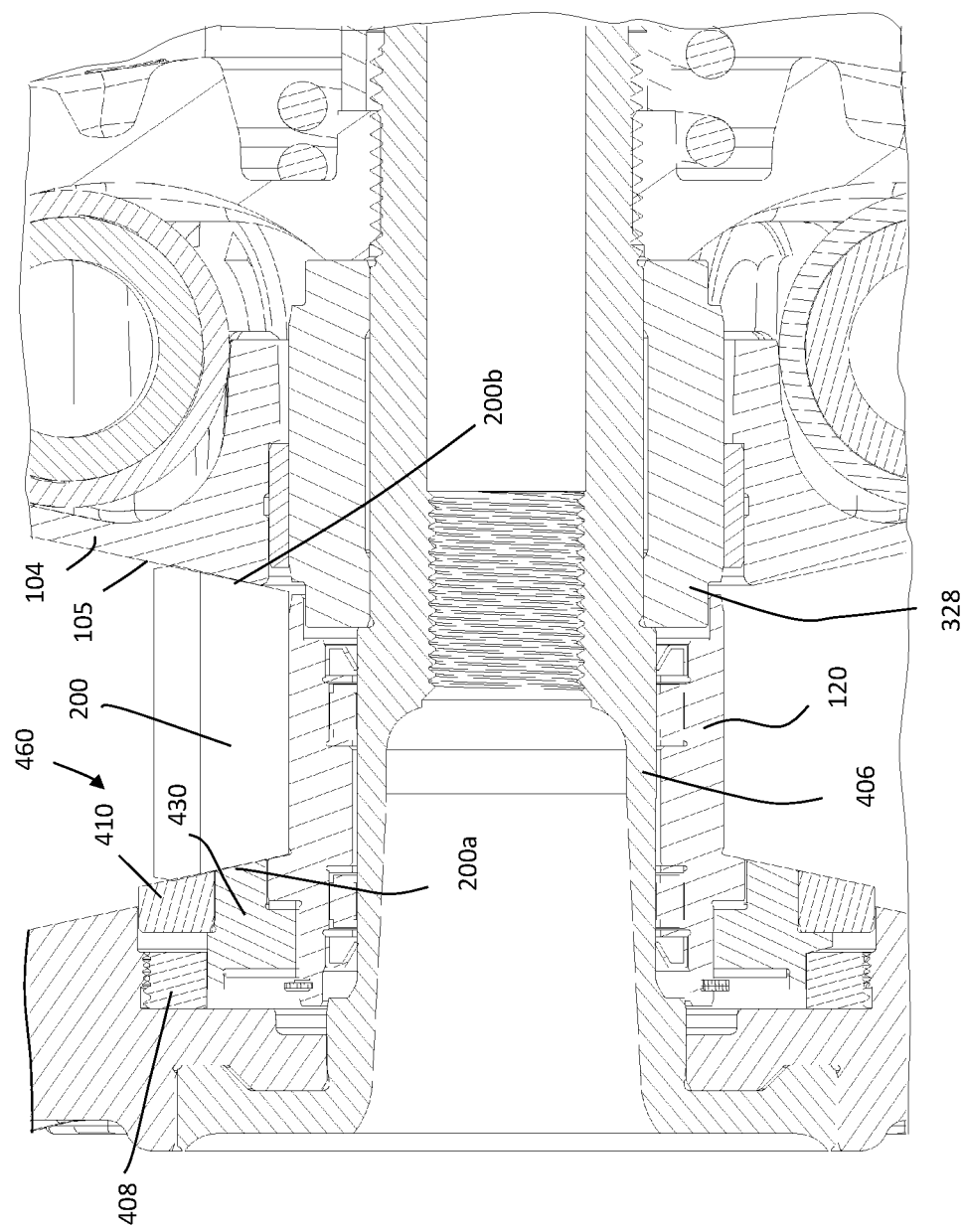
FIG. 16B is a cross-sectional close-up view of the engine braking system of the drive assembly of FIG. 8 in an active configuration.

The engine braking system 460 of the drive sheave assembly 400 in an engine braking configuration is illustrated in the close-up view of the engine braking system 460 of FIG. 16B. In an engine braking situation, as the belt 200 tries to overrun the sleeve 120, the one-way engagement member 430 locks onto the sleeve 120 which causes the one-way engagement member 430 to rotate in relation to the axial activation member 408 via the outside extending guides 431 on the one-way engagement member 430 within the inside grooves 411 of the axial activation member 408. This rotation moves the flange 410, the one-way engagement member 430 and the sleeve 120 axially towards the movable sheave assembly 104 such that at least the flange 410 and an engaging face 105 of the movable sheave assembly 104 engage respective side edges 200a and 200b of the belt to couple torque between the belt and the drive sheave assembly 400.

Another example of an engine braking system 500 of a drive sheave assembly is illustrated in FIG. 17. In this example, a central recess 503 in the fixed sheave 502 includes a seal groove 505 that receives a seal 550. Seal 550 prevents debris from entering between the fixed sheave 502 and the flange 510 in this example. Further in this example, a one-way engagement member 530 includes a seal groove 531 in which a seal 560 is received. Seal 560 prevents debris from entering between the one-way engagement member 530 and the sleeve 120.

Figure 19:
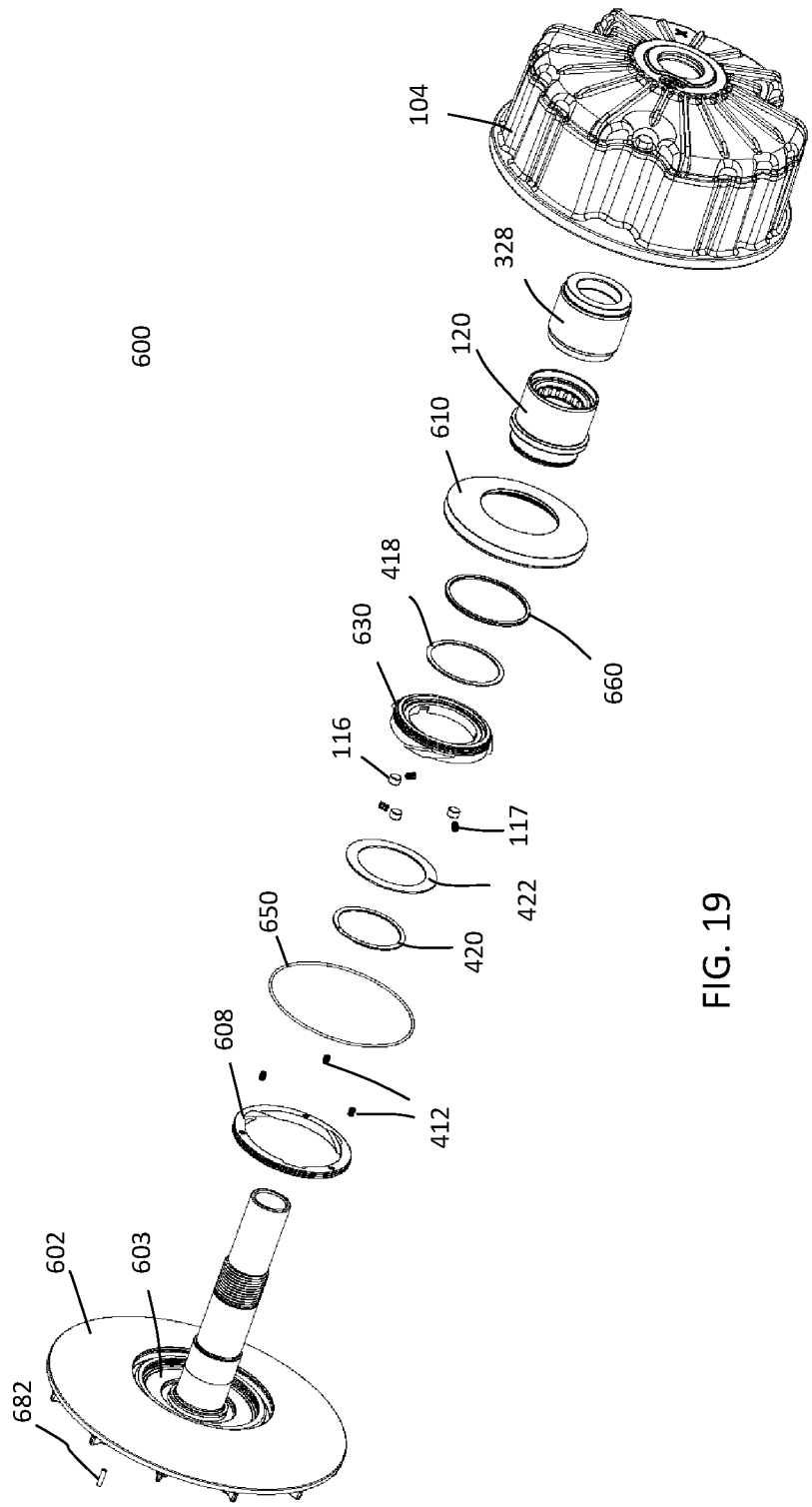
FIG. 19 illustrates is a unassembled side view of the drive sheave assembly including the engine braking system of FIG. 18.

Still another example of an engine braking system 601 of a drive sheave assembly 600 is illustrated in FIGS. 18 and 19. FIG. 18 illustrates a close-up cross-sectional view of the braking system 601 of the drive sheave assembly and FIG. 19 illustrates an unassembled view of the drive sheave assembly. In this example, a central recess 603 in the fixed sheave 602 includes a seal groove 605 that receives a seal 650. Seal 650 prevents debris from entering between the fixed sheave 602 and the flange 610 in this example. Further in this example, a one-way engagement member 630 includes a seal groove 631 in which a seal assembly 660 is received. Seal assembly 660 prevents debris from entering between the one-way engagement member 630 and the sleeve 120. In one example, the seal assembly 660 is captured between the flange 610 and a flange on the sleeve 120 with the use of a threaded connection. In another embodiment, a press fit connection may be used.

Another feature of the engine braking system 600, includes a sheave angled face 670 within the central recess 603 of the fixed sheave 602 and a counterpart axial angled face 672 on the axial activation member 608. The sheave angled face 670 and axial angled face 672 that help center the axial activation member 608 and the one-way engagement member 630 within the central recess 603 of the fixed sheave 602.

The fixed sheave 602 in the example of the FIG. 18 includes a vent bore 680 that extends through a portion of the fixed sleeve to the central recess 103 to prevent the sealed cavity, formed in the central recess 603 with at least the flange 610 and seals 650 and 660, from over pressurizing. A filter 682 of breathable material may be installed within the vent bore 680 to allow filtered air to pass into and out of the cavity as needed. An outside end of the vent bore 680 may include a swedge, stake, or retention fastener to prevent the filter 682 from falling out of the vent bore 680.

The drive sheave assembly 600 is further illustrated as including in FIG. 19, receive fastening members 412 in an example. As discussed above, in one example, the fastening members 412 are set screws that threadably engage threaded axial fastening bores in the axial activation member so the axial activation member 608 does not back out of the fixed sheave 602 during a reverse torque situation (engine braking situation). Also illustrated are retaining ring 420 and washer 422 used, in an example, to retain the locking rollers 116 and roller biasing members 117 within the one-way engagement member 630. Also illustrated in this example is thrust washer 418, sleeve 120 and shift collar 328.

Figure 20:
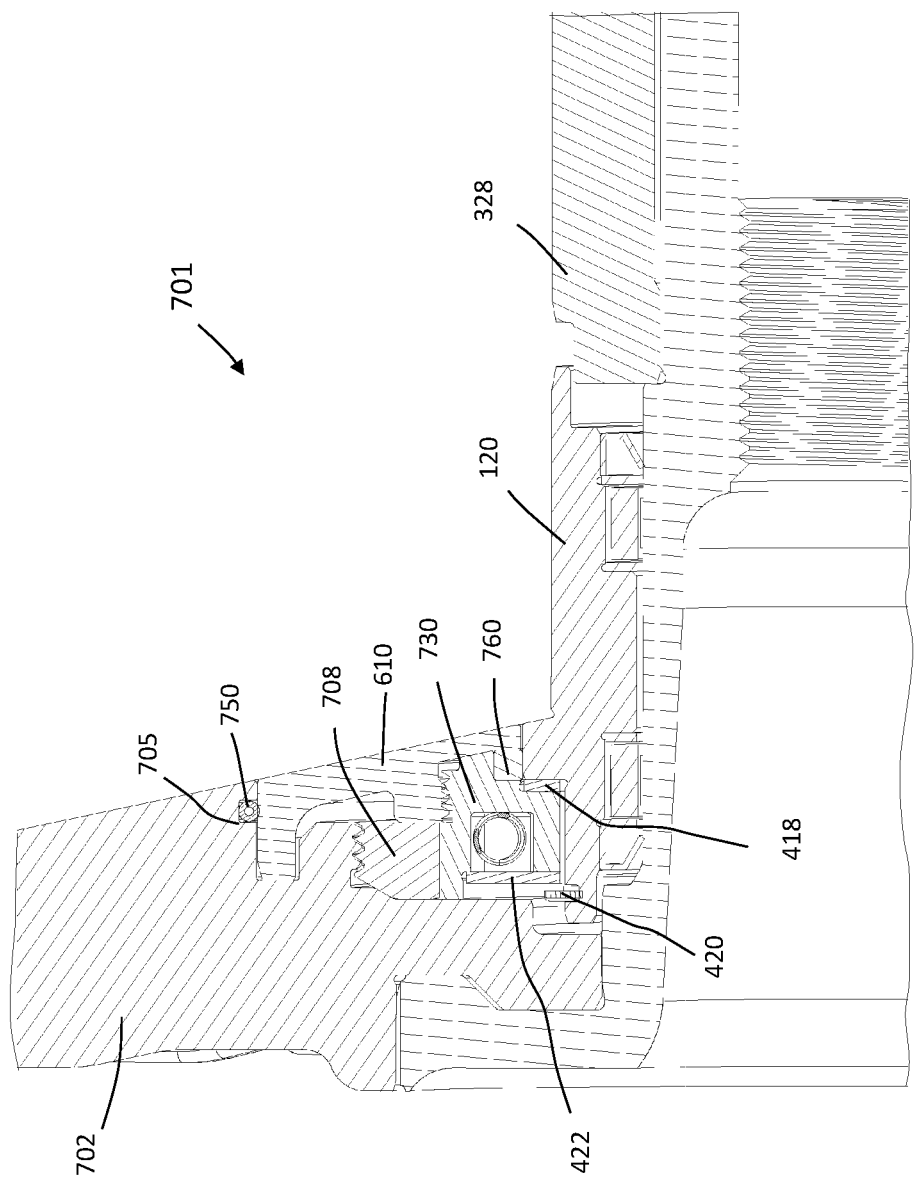
FIG. 20 illustrates a close-up cross-sectional view of an engine braking system according to another exemplary embodiment.
Figure 21:
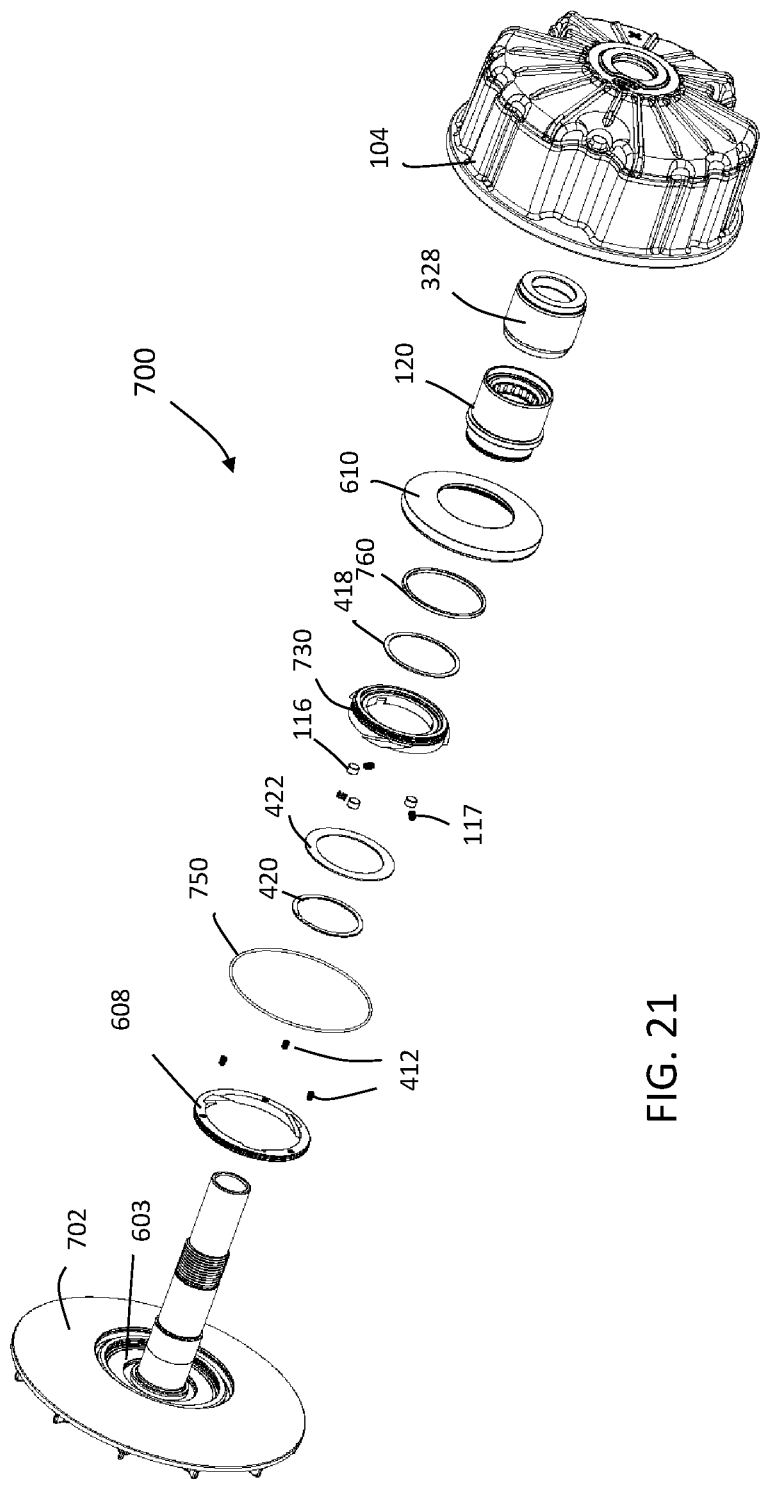
FIG. 21 illustrates an unassembled view of a drive sheave assembly that includes the engine braking system of FIG. 20.

Another embodiment of a drive sheave assembly 700 is illustrated in FIGS. 20, 21 and 22. FIG. 20 illustrates a close-up cross-sectional view of the engine braking system 701 of a drive sheave assembly 700. FIG. 21 is an unassembled view of the drive sheave assembly 700 in this example and FIG. 22 is an assembled cross-sectional side view of the drive sheave assembly 700.

Similar to the drive sheave assembly 600, drive sheave assembly 700 includes a moveable sheave assembly 104, the shaft collar 328, sleeve 120, thrust washer 418, one-way engagement member 630, locking rollers 116, roller biasing members 117, retaining ring 420, washer 422, receive fastening members 412, axial activation member 608.

The fixed sheave 702 of the drive sheave assembly 700 does not include a vent bore. In this embodiment, seal 760 may be made from a porous material that allows venting. In one example, the seal 760 is a felt ring seal breather. Further seal 750 includes a central bore in this example. In one example, seal 760 is a silicon hollow core O-ring seal. Further, the one-way engagement member 730 and flange 740 have a different connection configuration in this example where a portion of the flange 710 is coupled along a side of the one-way engagement member.

EXAMPLE EMBODIMENTS

Example 1 includes a drive sheave assembly of a continuously variable transmission. The drive sheave assembly includes a post, a fixed sheave, a movable sheave assembly, a sleeve and a movable sheave assembly. The fixed sheave is statically mounted on the fixed post. The fixed sheave includes a central recess. The movable sheave assembly is slidably mounted on the post. The movable sheave assembly includes a movable sheave activation assembly used to axially move the movable sheave assembly on the post. The sleeve is rotatably mounted on the post. At least a portion of the sleeve is positioned between the fixed sheave and the movable sheave assembly. The engine braking assembly includes an axial activation member, a one-way engagement member and a flange. The axial activation member is statically mounted within the central recess of the fixed sheave. The axial activation member has an inner surface that defines a central passage of the axial activation member. The inner surface of the axial activation member includes one of a plurality of engaging grooves and a plurality of extending guides. The one-way engagement member includes an inner surface that defines a central passage of the one-way engagement member. The central passage of the one-way engagement member is configured to engage a portion of the sleeve. The one-way engagement member includes an outer surface. A first portion of the outer surface of the one-way engagement member includes one of a plurality of engaging grooves and a plurality of extending guides configured to engage the one of the plurality of engaging grooves and the plurality of extending guides of axial activation member to create a moveable connection. The one-way engagement member is configured to rotate freely on the sleeve when the sleeve rotates in a first direction and lock onto the rotation of the sleeve when the sleeve rotates in a second direction causing the moveable connection between the one-way engagement member and the axial member to move the one-way member axially. The flange is coupled to the one-way engagement member to selectively engage a side of a belt with axial movement of the one-way engagement member.

Example 2 includes the drive sheave assembly of Example 1, wherein, the one-way engagement member further includes a side surface having spaced pockets with associated windows through the inner surface that defines the central passage of the one-way engagement member. The one-way engagement member further includes a locking roller received in each pocket and a roller biasing member for each locking roller. Each locking roller is configured to partially engage the sleeve through an associated window. A cam surface in each pocket and an associated roller biasing member is configured to allow the one-way engagement member to rotate freely in a first direction in relation to the sleeve and lock onto the sleeve when trying to rotate in a second direction that occurs during an engine braking condition.

Example 3 include the drive sheave assembly of any of the Examples 1-2, wherein the axial activation member further includes an outer surface that extents around an outer parameter of the axial activation member. The outer surface includes a knurled feature configured to engage a smooth surface within the central recess of the fixed sheave to prevent rotation and axial movement between the axial activation member and the fixed sheave.

Example 4 includes a drive sheave assembly of any of the Examples 1-2, wherein the axial activation member is engaged within the central recess of the fixed sheave by one of a knurl feature, splines, press fit, threaded connection and with at least one fastener.

Example 5 include the drive sheave assembly of any of the Examples 1-4, further including an engine braking disengagement bias member configure to generate a bias force to retain the one-way engagement member within the central recess when an engine braking condition is not present.

Example 6 includes the drive sheave assembly of any of the Examples 1-5, further including a first seal positioned between the flange and an inside surface of the central passage of the fixed sheeve and a second seal positioned at least between the sleeve and a portion of the one-way engagement member.

Example 7 includes the drive sheave assembly of Example 6, wherein the first seal is a hollow core O-ring seal.

Example 8 includes the drive sheave assembly of Example 6, wherein the second seal is a felt ring seal breather.

Example 9 includes the drive sheave assembly of any of the Examples 1-8, wherein the fixed sheave includes a vent bore that extends into the central recess.

Example 10 includes the drive sheave assembly of Example 9, further including a filter positioned within the vent bore of the fixed sheave.

Example 11 includes the drive sheave assembly of any of the Examples 1-10, wherein the plurality of engaging grooves and a plurality of extending guides are threads forming a threaded connection.

Example 12 includes a drive sheave assembly of a continuously variable transmission. The drive sheave assembly includes a post, a fixed sheave, a moveable sheave assembly, a sleeve, and an engine braking assembly. The fixed sheave is statically mounted on the post. The fixed sheave includes a central recess. The movable sheave assembly is slidably mounted on the post. The movable sheave assembly includes a movable sheave activation assembly to axially move the movable sheave assembly on the post. The sleeve is rotatably mounted on the post. At least a portion of the sleeve is positioned between the fixed sheave and the movable sheave assembly. The engine braking assembly includes an axial activation member that is coupled within the central recess of the fixed post. The axial activation member includes an inner surface that has insides grooves. The one-way engagement member includes an inner surface that defines a central passage of the one-way engagement member. The central passage of the one-way engagement member is configured to engage a portion of the sleeve. The one-way engagement member is configured to lock onto the sleeve during an engine braking condition. The one-way engagement member further includes outside extending guides that are received within the inside grooves of the axial activation member. The engine braking assembly further includes a flange mounted on the one-way collar to selectively engage a side edge of belt during the engine braking condition due to an axial movement of the one-way engagement member.

Example 13 includes the drive sheave assembly of Example 12, further including a seal that is positioned between an inside surface of the central recess of the fixed sheave and a surface of the flange.

Example 14 includes the drive sheave assembly of any of the Examples 12-13, further including a seal positioned between the one-way engagement member and the sleeve.

Example 15 includes drive sheave assembly of any of the Examples 12-14, further wherein the one-way engagement member further includes a side surface having spaced pockets with associated windows through the inner surface that defines the central passage of the one-way engagement member. The one-way engagement member further includes a locking roller received in each pocket and a roller biasing member for locking roller. Each locking roller is configured to partially engage the sleeve through an associated window. A cam surface in each pocket and each associated roller biasing member is configured to allow the one-way engagement member to rotate freely in a first direction in relation to the sleeve and lock onto the sleeve when trying to rotate in a second direction that occurs during an engine braking condition. Further a washer is positioned to retain the locking rollers and roller biasing members within each associated pocket.

Example 16 includes the drive sheave assembly of any of the Examples 12-15, wherein the fixed sheave includes a vent bore that extends into the central recess. A filter is positioned within the vent bore of the fixed sheave.

Example 17 includes the drive sheave assembly of any of the Examples 12-16, wherein the axial activation member is engaged within the central recess of the fixed sheave by one of a knurl feature, splines, press fit, threaded connection and with at least one fastener.

Example 18 includes the drive sheave assembly of any of the Examples 12-17, further including an engine braking disengagement bias member that is configure to generate a bias force to retain the one-way engagement member within the central recess when an engine braking condition is not present.

Example 19 includes a vehicle. The vehicle includes an engine to generate engine torque, a drivetrain that is configured to deliver the engine torque to wheels of the vehicle, and a CVT coupling the engine torque between the engine and the drive train. The CVT includes a drive sheave in operational communication with the engine and driven sheave in operational communication with the drivetrain.

The drive sheave is in operational communication with the drive sheave with an endless looped member. The drive sheave includes a post, a fixed sheave, a movable sheave assembly, a sleeve, and an engine braking assembly. The fixed sheave is statically mounted on the fixed post. The fixed sheave includes a central recess. The movable sheave assembly is slidably mounted on the post. The movable sheave assembly includes a movable sheave activation assembly to axially move the movable sheave assembly on the post. The sleeve is rotatably mounted on the post. At least a portion of the sleeve is positioned between the fixed sheave and the movable sheave assembly. The engine braking assembly includes an axial activation member, a one-way engagement member, and a flange. The axial activation member is statically mounted within the central recess of the fixed sheave. The axial activation member has an inner surface that defines a central passage of the axial activation member. The inner surface of the axial activation member includes one of a plurality of engaging grooves and a plurality of extending guides. The one-way engagement member includes an inner surface that defines a central passage of the one-way engagement member. The central passage of the one-way engagement member is configured to engage a portion of the sleeve. The one-way engagement member includes an outer surface. A portion of the outer surface of the one-way engagement member includes one of a plurality of engaging grooves and a plurality of extending guides configured to engage the one of the plurality of engaging grooves and the plurality of extending guides of axial activation member to create a moveable connection. The one-way engagement member is configured to rotate freely on the sleeve when the sleeve rotates in a first direction and lock onto the rotation of the sleeve when the sleeve rotates in a second direction causing the moveable connection between the one-way engagement member and the axial member to move the one-way member axially. The flange is coupled to the one-way engagement member to selectively engage a side of the endless looped member with axial movement of the one-way engagement member.

Example 20 includes the vehicle of Example 19 where the drive sheave further includes a first seal that is positioned between the flange and an inside surface of the central passage of the fixed sheave and a second seal that is positioned at least between the sleeve and a portion of the one-way engagement member.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A drive sheave assembly of a continuously variable transmission, the drive sheave assembly comprising:
    a post;
    a fixed sheave statically mounted on the fixed post, the fixed sheave including a central recess;
    a movable sheave assembly slidably mounted on the post, the movable sheave assembly including a movable sheave activation assembly to axially move the movable sheave assembly on the post;
    a sleeve rotatably mounted on the post, at least a portion of the sleeve positioned between the fixed sheave and the movable sheave assembly; and
    an engine braking assembly including,
        an axial activation member statically mounted within the central recess of the fixed sheave, the axial activation member having an inner surface that defines a central passage of the axial activation member, the inner surface of the axial activation member including one of a plurality of engaging grooves and a plurality of extending guides;
        a one-way engagement member including an inner surface that defines a central passage of the one-way engagement member, the central passage of the one-way engagement member configured to engage a portion of the sleeve, the one-way engagement member including an outer surface, a portion of the outer surface of the one-way engagement member including one of a plurality of engaging grooves and a plurality of extending guides configured to engage the one of the plurality of engaging grooves and the plurality of extending guides of axial activation member to create a moveable connection, wherein the one-way engagement member is configured to rotate freely on the sleeve when the sleeve rotates in a first direction and lock onto the rotation of the sleeve when the sleeve rotates in a second direction causing the moveable connection between the one-way engagement member and the axial member to move the one-way member axially; and
        a flange coupled to the one-way engagement member to selectively engage a side of a belt with axial movement of the one-way engagement member.

2. The drive sheave assembly of claim 1, wherein, the one-way engagement member further includes a side surface having spaced pockets with associated windows through the inner surface that defines the central passage of the one-way engagement member, the one-way engagement member further comprising:
    a locking roller received in each pocket, each locking roller configured to partially engage the sleeve through an associated window; and
    a roller biasing member for each locking roller, a cam surface in each pocket and each associated roller biasing member configured to allow the one-way engagement member to rotate freely in a first direction in relation to the sleeve and lock onto the sleeve when trying to rotate in a second direction that occurs during an engine braking condition.

3. The drive sheave assembly of claim 1, wherein the axial activation member further comprises:
    an outer surface that extents around an outer parameter of the axial activation member, the outer surface including a knurled feature configurated to engage a smooth surface within the central recess of the fixed sheave to prevent rotation and axial movement between the axial activation member and the fixed sheave.

4. The drive sheave assembly of claim 1, wherein the axial activation member is engaged within the central recess of the fixed sheave by one of a knurl feature, splines, press fit, threaded connection and with at least one fastener.

5. The drive sheave assembly of claim 1, further comprising:
    an engine braking disengagement bias member configure to generate a bias force to retain the one-way engagement member within the central recess when an engine braking condition is not present.

6. The drive sheave assembly of claim 1, further comprising:
    a first seal positioned between the flange and an inside surface of the central passage of the fixed sheeve; and a second seal positioned at least between the sleeve and a portion of the one-way engagement member.

7. The drive sheave assembly of claim 6, wherein the first seal is a hollow core O-ring seal.

8. The drive sheave assembly of claim 6, wherein the second seal is a felt ring seal breather.

9. The drive sheave assembly of claim 1, wherein the fixed sheave includes a vent bore that extends into the central recess.

10. The drive sheave assembly of claim 9, further comprising:
a filter positioned within the vent bore of the fixed sheave.

11. The drive sheave assembly of claim 1, wherein the plurality of engaging grooves and a plurality of extending guides are threads forming a threaded connection.

12. A drive sheave assembly of a continuously variable transmission, the drive sheave assembly comprising:
a post;
a fixed sheave statically mounted on the post, the fixed sheave including a central recess;
a movable sheave assembly slidably mounted on the post, the movable sheave assembly including a movable sheave activation assembly to axially move the movable sheave assembly on the post;
a sleeve rotatably mounted on the post, at least a portion of the sleeve positioned between the fixed sheave and the movable sheave assembly; and
an engine braking assembly including,
an axial activation member coupled within the central recess of the fixed post, the axial activation member including an inner surface having insides grooves,
a one-way engagement member including an inner surface that defines a central passage of the one-way engagement member, the central passage of the one-way engagement member configured to engage a portion of the sleeve, the one-way engagement member configured to lock onto the sleeve during an engine braking condition, the one-way engagement member further including outside extending guides that are received within the inside grooves of the axial activation member, and
a flange mounted on the one-way collar to selectively engage a side edge of belt during the engine braking condition due to an axial movement of the one-way engagement member.

13. The drive sheave assembly of claim 12, further comprising:
a seal positioned between an inside surface of the central recess of the fixed sheave and a surface of the flange.

14. The drive sheave assembly of claim 12, further comprising:
a seal positioned between the one-way engagement member and the sleeve.

15. The drive sheave assembly of claim 12, further wherein, the one-way engagement member further includes a side surface having spaced pockets with associated windows through the inner surface that defines the central passage of the one-way engagement member, the one-way engagement member further comprising:
a locking roller received in each pocket, each locking roller configured to partially engage the sleeve through an associated window;
a roller biasing member for locking roller, a cam surface in each pocket and each associated roller biasing member configured to allow the one-way engagement member to rotate freely in a first direction in relation to the sleeve and lock onto the sleeve when trying to rotate in a second direction that occurs during an engine braking condition;
a washer positioned to retain the locking rollers and roller biasing members within each associated pocket.

16. The drive sheave assembly of claim 12, wherein the fixed sheave includes a vent bore that extends into the central recess, further comprising:
a filter positioned within the vent bore of the fixed sheave.

17. The drive sheave assembly of claim 12, wherein the axial activation member is engaged within the central recess of the fixed sheave by one of a knurl feature, splines, press fit, threaded connection and with at least one fastener.

18. The drive sheave assembly of claim 12, further comprising:
an engine braking disengagement bias member configure to generate a bias force to retain the one-way engagement member within the central recess when an engine braking condition is not present.

19. A vehicle comprising:
an engine to generate engine torque:
a drivetrain configured to deliver the engine torque to wheels of the vehicle; and
a continuously variable transmission (CVT) coupling the engine torque between the engine and the drive train, the CVT including a drive sheave in operational communication with the engine and driven sheave in operational communication with the drivetrain, the drive sheave in operational communication with the drive sheave with an endless looped member, the drive sheave including,
a post;
a fixed sheave statically mounted on the fixed post, the fixed sheave including a central recess;
a movable sheave assembly slidably mounted on the post, the movable sheave assembly including a movable sheave activation assembly to axially move the movable sheave assembly on the post;
a sleeve rotatably mounted on the post, at least a portion of the sleeve positioned between the fixed sheave and the movable sheave assembly; and
an engine braking assembly including,
an axial activation member statically mounted within the central recess of the fixed sheave, the axial activation member having an inner surface that defines a central passage of the axial activation member, the inner surface of the axial activation member including one of a plurality of engaging grooves and a plurality of extending guides;
a one-way engagement member including an inner surface that defines a central passage of the one-way engagement member, the central passage of the one-way engagement member configured to engage a portion of the sleeve, the one-way engagement member including an outer surface, a portion of the outer surface of the one-way engagement member including one of a plurality of engaging grooves and a plurality of extending guides configured to engage the one of the plurality of engaging grooves and the plurality of extending guides of axial activation member to create a moveable connection, wherein the one-way engagement member is configured to rotate freely on the sleeve when the sleeve rotates in a first direction and lock onto the rotation of the sleeve when the sleeve rotates in a second direction causing the moveable connection between the one-way engagement member and the axial member to move the one-way member axially; and a flange coupled to the one-way engagement member to selectively engage a side of the endless looped member with axial movement of the one-way engagement member.

20. The vehicle of claim 1, where the drive sheave further comprises:

a first seal positioned between the flange and an inside surface of the central passage of the fixed sheeve; and a second seal positioned at least between the sleeve and a portion of the one-way engagement member.

\* \* \* \* \*